(12) United States Patent
Austin et al.

(10) Patent No.: US 6,778,251 B1
(45) Date of Patent: Aug. 17, 2004

(54) LIQUID CRYSTAL OPTICAL PROCESSING SYSTEMS

(75) Inventors: Lindsay W. Austin, Santa Rosa, CA (US); Shanti A. Cavanaugh, Santa Rosa, CA (US)

(73) Assignee: Spectraswitch, Inc., Santa Rosa, CA (US)

(*) Notice: Subject to any disclaimer, the term of this patent is extended or adjusted under 35 U.S.C. 154(b) by 0 days.

(21) Appl. No.: 10/394,400

(22) Filed: Mar. 19, 2003

Related U.S. Application Data

(63) Continuation of application No. 10/371,235, filed on Feb. 21, 2003.

(51) Int. Cl.[7] .......................... G02F 1/13; G02F 1/1343
(52) U.S. Cl. ..................... 349/201; 349/198; 349/139; 349/39
(58) Field of Search ................................ 349/201, 198, 349/39, 139

(56) References Cited

U.S. PATENT DOCUMENTS

| | | | | |
|---|---|---|---|---|
| 5,528,402 A | * | 6/1996 | Parker | 349/139 |
| 5,877,876 A | * | 3/1999 | Birdwell | 349/39 |
| 6,515,751 B1 | * | 2/2003 | Craighead et al. | 356/519 |

OTHER PUBLICATIONS

Y. Hirai et al, Fine Pattern Fabrication on Glass Surface by Imprint Lithography, MNE 2002 Conference, Sep. 16, 2002, pp. 1–2, Switzerland.

Y.K. Park and Hubert Kostal, Nano–Optics Redefine Rules for Optical Processing CommsDesign Magazine Article ID#16505229. Aug. 1, 2002, pp. 1–6, Manhasset, NY.

A. Sharon et al, Resonant Grating–waveguide Structures for Visible and Near–infrared Radiation, Nov. 1997, vol. 14, No. 11 Journal Opt. Soc. Am. A, pp. 2285–2993, WA, DC.

Jian Jim Wang et al, Electrically Tunable Free–space Sub–wavelength Grating Filters with 30nm Tuning Range, OFC Conference Proc. vol. 1, Mar. 23, 2003, pp. 31–32, Atlanta, GA.

Ignacio Del Villar et al, Analysis of One–dimensional Photonic Band Gap Structures with a Liquid Crystal Detect . . . Mar. 10, 2003, OSA vol. 11, No. 5, pp. 430–436, WA, DC.

Jian Jim Wang et al., Design and Realization of Multi–Layer Integrated Nano–Optic Devices, NFOEC Technical Proceedings, Sep. 7, 2003, pp. 148–156, Orlando, FL.

Jian Jim Wang. Subwavelength Optical Elements (SOEs)—A Path to Integrate Optical Components on a Chip. NFOEC Technical Proceedings, Sep. 15, 2002, pp 1144–1152, Dallas, TX.

* cited by examiner

*Primary Examiner*—Huyen Ngo
(74) *Attorney, Agent, or Firm*—Strategic Patent Services, Inc.; Gary Zalewski

(57) ABSTRACT

A liquid crystal optical processor is configured in various applications, including a liquid crystal optical switch, polarization independent variable optical attenuator, wavelength selector switch, optical multiplexer and demultiplexer, tunable filter and flexible optical add drop multiplexer. The optical processor is generally configured to include a deposited metal gasket moisture barrier bonding two opposing substrates each having a spacer layer to accurately control cell gap thickness. The optical processor may be temperature insensative and be configured in one or more pixel configurations. The optical processor may include integrated subwavelength optical gratings. It may also include an integrated thermal sensor and heater deposition layer sandwiched between or deposited on at least one or both opposing substrates.

3 Claims, 32 Drawing Sheets

FIGURE 2C
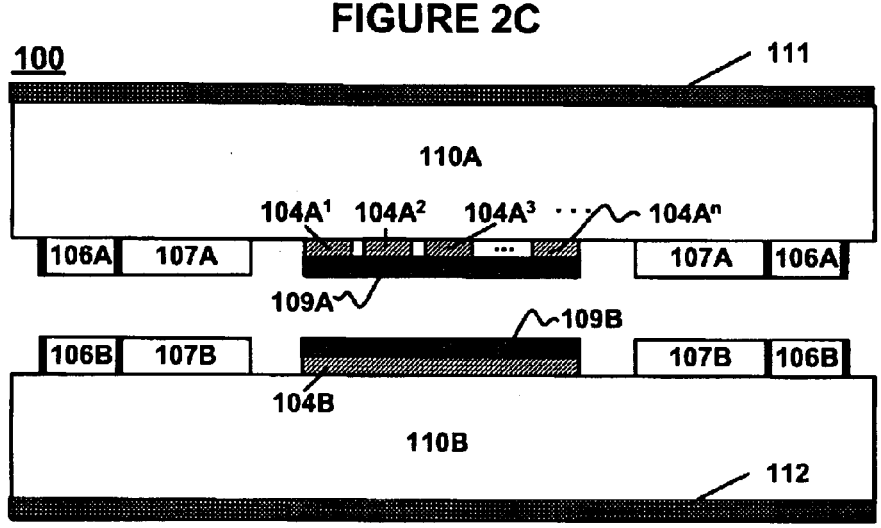
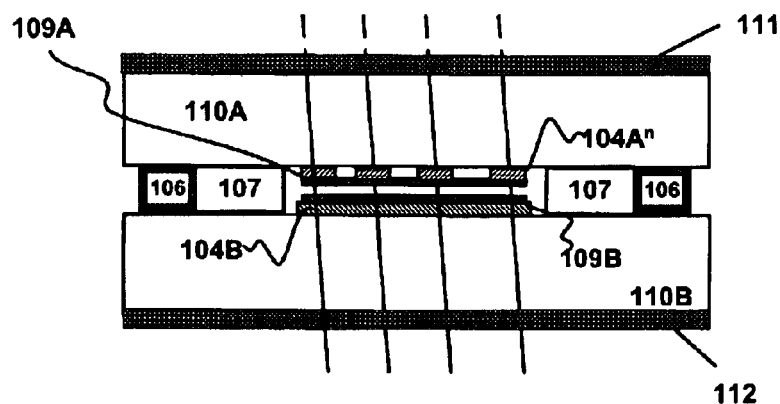
FIGURE 2D

FIGURE 3E
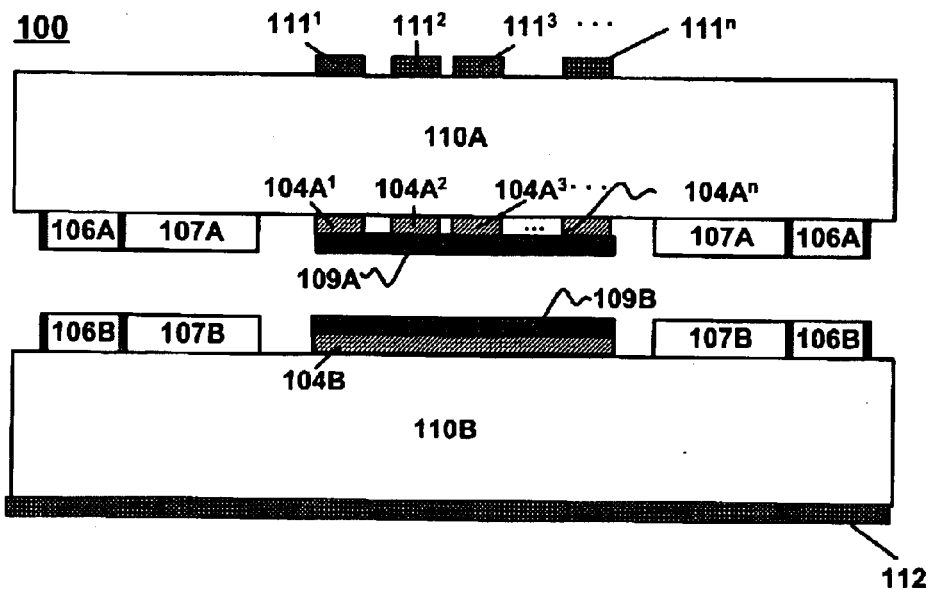
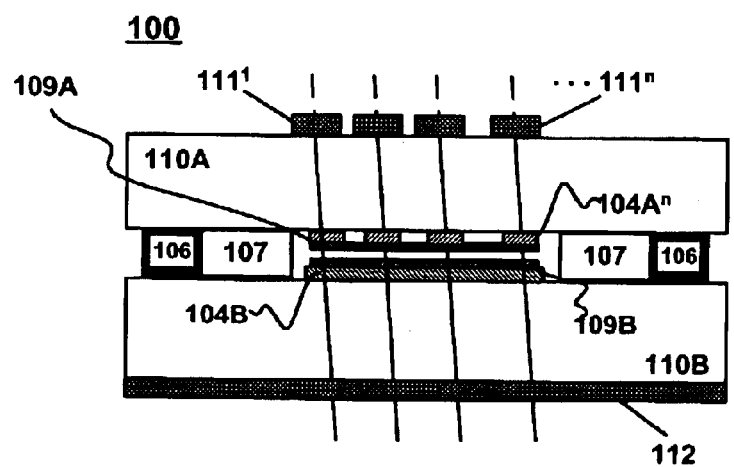
FIGURE 3F

FIGURE 3G
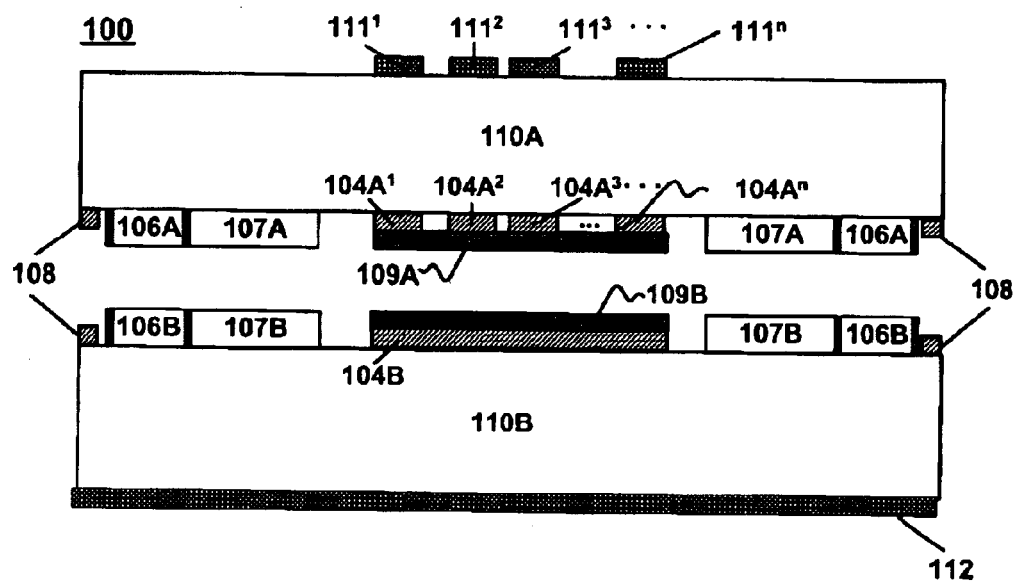
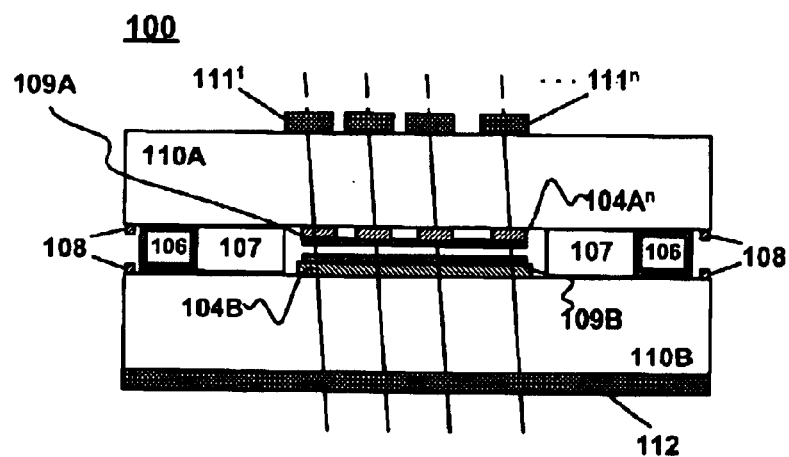
FIGURE 3H

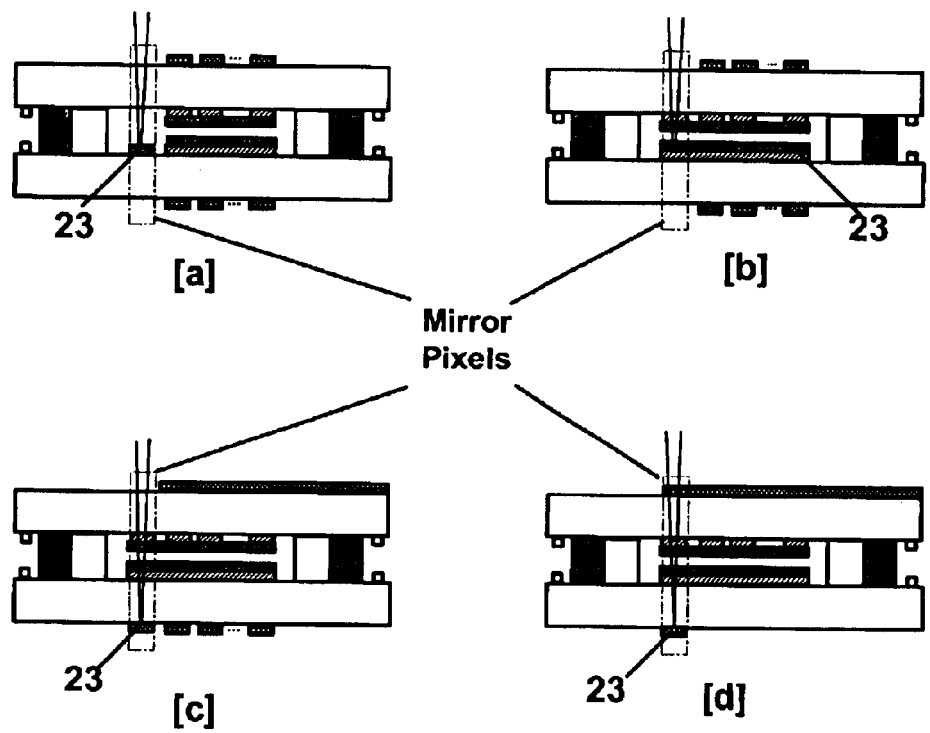

FIGURE 13
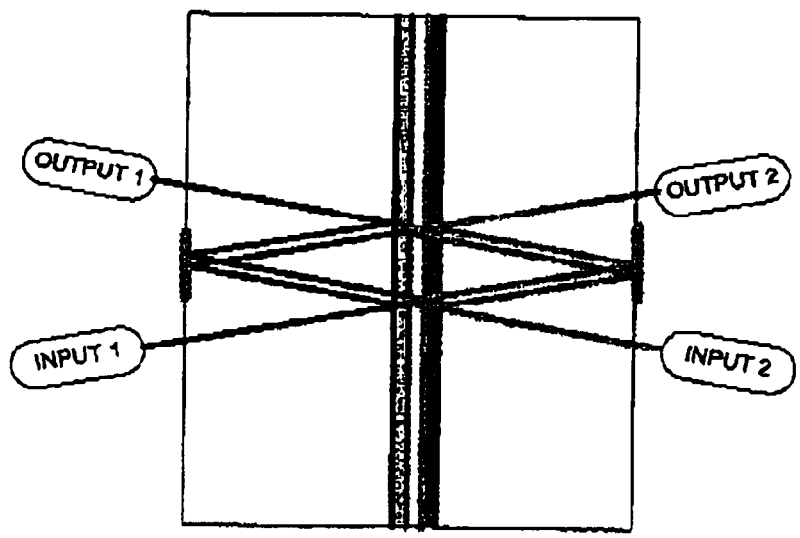
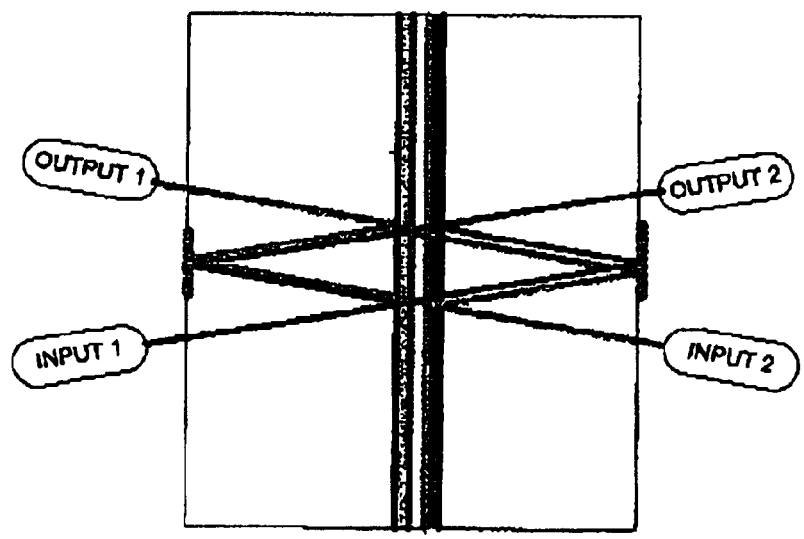
FIGURE 14

LIQUID CRYSTAL OPTICAL PROCESSING SYSTEMS

CROSS-REFERENCE TO RELATED APPLICATIONS

This application is a continuation of and claims priority from commonly assigned application Ser. No. 10/371235, titled "Liquid Crystal Cell Platform", filed Feb. 21, 2003. This application is also related to the following copending U.S. nonprovisional applications, all of which are herein incorporated by reference; "Fabrication Method for Liquid Crystal Cell", filed Feb. 21, 2003 and having Ser. No. 10/371976, "Thermal Control System for Liquid Crystal Cell", filed Feb. 21, 2003 and having Ser. No. 10/391,983, and "Liquid Crystal Variable Optical Attenuator", filed Mar. 5, 2003 and having Ser. No. 10/397,384.

FIELD OF INVENTION

This invention relates generally to optical liquid crystal systems. More particularly, it relates to liquid crystal optical processing platforms having integrated subwavelength optical elements and configured for optical switching, polarization independent variable optical attenuation, wavelength selective switching, optical multiplexing, optical demultiplexing, tunable filters and flexible optical add drop multiplexer applications.

BACKGROUND OF THE INVENTION

Since the advent of fiber optics, the fiber optical communication infrastructures have become more diverse and sophisticated. The fiber optic applications range from low speed, local area networks to high speed, long distance telecommunication systems. In recent years, the demands for greater bandwidth and lower network costs have resulted in the increasingly integrated optical systems that offer multiple functionality, wafer-level integration and in a standardized traditional chip package.

Optical nanostructures have been the object of scientific investigation for several years but advances in material science and imprint lithography have only recently resulted in their cost effective manufacturing and availability as packagable array components for industry. An optical nanostructure is derived with feature sizes below the wavelength of light, so each element in the array has uniform behavior over a broad wavelength, wide acceptance angles and unique optical properties by function of varying dimensions of the underlying grating features. Optical nanostructures have been designed to function as wavelength filters, polarizers, polarizing beam splitters, combiners, and waveplates. As a result of their unique optical properties, high performance and miniature form factor, optical nanostructures represent a promising new technology that will have broad ramifications to tomorrow's array-based optical systems.

Liquid crystal technology is known to be dynamically controlled and configured to enable a range of optical switching and signal conditioning applications. Formed with opposing plates of sealed substrates, liquid crystal cells are considered a prospect technology and integration target capable of supplying the active layer to a nanostructure integrated therewith. Wang et. Al has recently demonstrated an experimental electrically tunable filter based on a waveguide resonant sub-wavelength nanostructure-grating filter incorporating a tuning mechanism in a thin liquid crystal. The device experiment was functional and exhibited performance of 30 nanometer tuning.

Given the assertion that various useful optical processing functions can be achieved at low cost by way of integrating active liquid crystal with passive integrated nanostructured gratings, the present invention addresses specific applications directed integrated structures in liquid crystal optical switching, polarization independent variable optical attenuation, wavelength selective switching, optical multiplexing, optical demultiplexing, tunable filters and flexible optical add drop multiplexers:

FEATURES OF THE INVENTION

The present invention contains several features and embodiments that may be configured independently or in combination with other features of the present invention, depending on the application and operating configurations. The delineation of such features is not meant to limit the scope of the invention but merely to outline certain specific features as they relate to the present invention.

It is a feature of the present invention to provide an integrated liquid crystal platform configured to function as a 1×2 optical switch.

It is a feature of the present invention to provide an integrated liquid crystal platform configured to function as a 2×2 optical switch.

It is a feature of the present invention to provide an integrated liquid crystal platform configured to function as a polarization independent variable optical attenuator.

It is a feature of the present invention to provide an integrated liquid crystal platform configured to function as a polarization independent variable optical attenuator capable of assuming a known state upon power failure.

It is a feature of the present invention to provide an multi-pixel integrated liquid crystal platform configured to function as a wavelength selector switch.

It is a feature of the present invention to provide an integrated liquid crystal configured to function as a tunable filter.

It is a feature of the present invention to provide a novel architecture of a flexible optical add drop multiplexer (FOADM) suitable to function with a liquid crystal tunable filter.

It is a feature of the present invention to provide a liquid crystal cell with integrated grating for use in multiplexing and demultiplexing applications.

It is a feature of the present invention to provide a liquid crystal cell whose index of refraction is changed dynamically by specific actuation of stepped electrode bands.

It is a feature of the present invention to provide a liquid crystal cell whose index of refraction can be fixed by anchoring the cell with tuned periodic alignment structures.

It is a feature of the present invention to provide a liquid crystal platform configured into a multi-function variable optical attenuator capable of defaulting to a known state in the event of power loss.

It is a feature of the present invention to provide liquid crystal tunable filters, add/drop multiplexers, wavelength selectors, switches, multiplexers and demultiplexers, that may be constructed from materials substantially impervious to moisture.

It is a feature of the present invention to provide single pixel and multiple pixel liquid crystal tunable filters, add/drop multiplexers, wavelength selectors, switches, multiplexers and demultiplexers, that may be constructed from materials substantially impervious to moisture.

It is a feature of the present invention to provide liquid crystal tunable filters, add/drop multiplexers, wavelength selectors, switches, multiplexers and demultiplexers that may contain a heater and temperature sensor integrated therein as single physical element and to provide for accurate and uniform control of heating and temperature sensing.

It is a feature of the-present invention to provide a novel method of operating liquid crystal tunable filter, optical add/drop multiplexer, wavelength selector, switch, multiplexer and demultiplexer cell and pixel array across a range of temperature without the need for lookup tables otherwise used to compensate for real time temperature changes.

It is a feature of the present invention to provide a liquid crystal tunable filter, optical add/drop multiplexer, wavelength selector, switch, multiplexer and demultiplexer cells that pass the strict telecommunications guidelines as outlined in Telcordia GR1221 without the need for hermetic housing.

It is a feature of the present invention to provide optically flat liquid crystal tunable filter, optical add/drop multiplexer, wavelength selector, switch, multiplexer and demultiplexer cells not prone to warpage during fabrication process.

It is a feature of the present invention to provide optically flat liquid crystal tunable filter, optical add/drop multiplexer, wavelength selector, switch, multiplexer and demultiplexer cells not prone to warpage when exposed to various thermal and humidity atmospheres.

It is a feature of the present invention to provide liquid crystal tunable filter, optical add/drop multiplexer, wavelength selector, switch, multiplexer and demultiplexer cells whose thickness may be controlled at nanometer resolution.

SUMMARY OF THE INVENTION

The disadvantages associated with the prior art may be overcome by a liquid crystal optical processor configured in various applications, including a liquid crystal optical switch, polarization independent variable optical attenuator, wavelength selector switch, optical multiplexer and demultiplexer, tunable filter and flexible optical add drop multiplexer. The optical processor is generally configured to include a deposited metal gasket moisture barrier bonding two opposing substrates each having a spacer layer to accurately control cell gap thickness. The optical processor may be configured in one or more pixel configurations. The optical processor may include integrated subwavelength optical gratings. It may also include an integrated thermal sensor and heater deposition layer sandwiched between or deposited on at least one or both opposing substrates.

The disadvantages associated with the prior art may further be overcome with a liquid crystal optical switch, polarization independent variable optical attenuator, wavelength selector switch, optical multiplexer/demultiplexer and tunable filter cell control system utilizing a time division scheme that multiplexes temperature sensing and heating functions across an integrated active thermal element in each device, such that the cell may generally be kept at a constant temperature. In addition or in place of heating the cell, a calibration process characterizes the profile of the cell and generates a polynomial regression formula that provides the voltage drive output the platform based on the platform temperature and state of each pixel. The control system stores the state of the liquid crystal cell, the regression formula, and reads the temperature of the liquid crystal cell to compute and assert the temperature compensated voltage drive across the pixel array.

BRIEF DESCRIPTION OF THE FIGURES

FIGS. 2c and 2d show example second embodiment multi-pixel liquid crystal cell platform having integrated optical elements on the first and second substrates that function globally across multiple pixels.

FIGS. 3e and 3f show example third embodiment multi-pixel liquid crystal cell platform having integrated optical elements on the first substrate providing an optical function at each local pixel location and an integrated optical element on the second substrate that provides a global optical function across multiple pixels.

FIGS. 3g and 3h shows the temperature sensor/heating device of the present invention that can be configured across all embodiments of the present invention.

FIG. 4B shows various mirror pixel constructs designed to fully reflect an optical signal off the mirror pixel.

FIG. 13 shows an integrated liquid crystal platform configured into a 2×2 optical switch.

FIG. 14 shows the switch of FIG. 13 in a second state.

DETAILED DESCRIPTION

Throughout this application, like reference numbers as used to refer to like elements. For instance, the two substrates used to form the liquid crystal cell of the present invention are referred to throughout this applications as 110A and 110B. Those supporting elements and features of the invention that are distributed on each substrate and later combined may be referred to under their index reference for a particular substrate 'A, 'B or for simplicity sake, under the shared reference '.

Figure 1A:
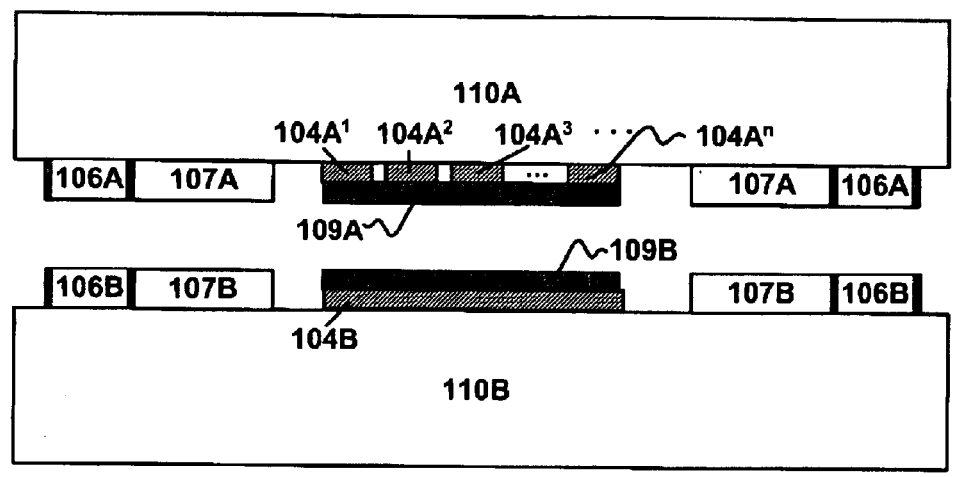
FIGS. 1a and 1b show example first embodiment multi-pixel liquid crystal platforms.
Figure 1B:
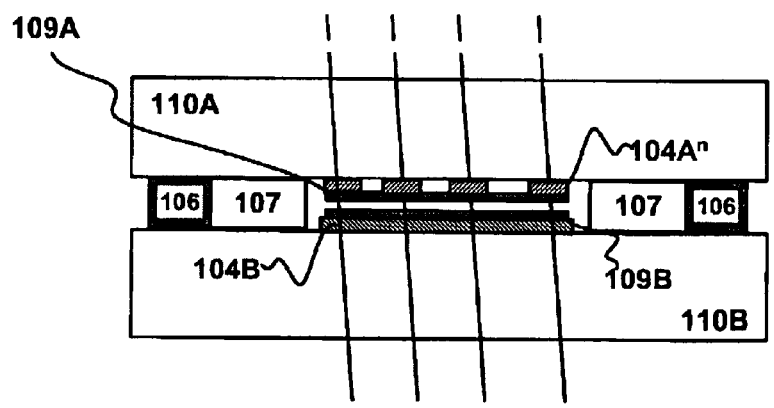

A first embodiment of the present invention is presented in FIG. 1a and 1b, which shows a multi-pixel liquid crystal cell platform 100 having a first substrate 110A in opposition to a second substrate 110B. In this embodiment, the first substrate may contain an inner surface having a conductive electrode layer 104 patterned to form individual pixel locations $104A^1$ through $104A^n$, liquid crystal alignment layer 109A, a metal gasket element layer 106A and spacer element layer 107A. The second substrate 101B contains an inner surface having a common a conductive electrode layer 104B spanning the pixels defined above, a liquid crystal alignment layer 109B, metal gasket element layer 106B and spacer element layer 107B. In this embodiment and all embodiments, is preferred to maintain a common electrode 104B across multiple pixels in the array since it may form a ground plane common to the array. However, it need be noted that within the scope of this invention it will be clear that a multi-pixel mask similar to that used in the first substrate may also be used to form individual pixel electrodes in electrode layer 104B.

Figure 2A:
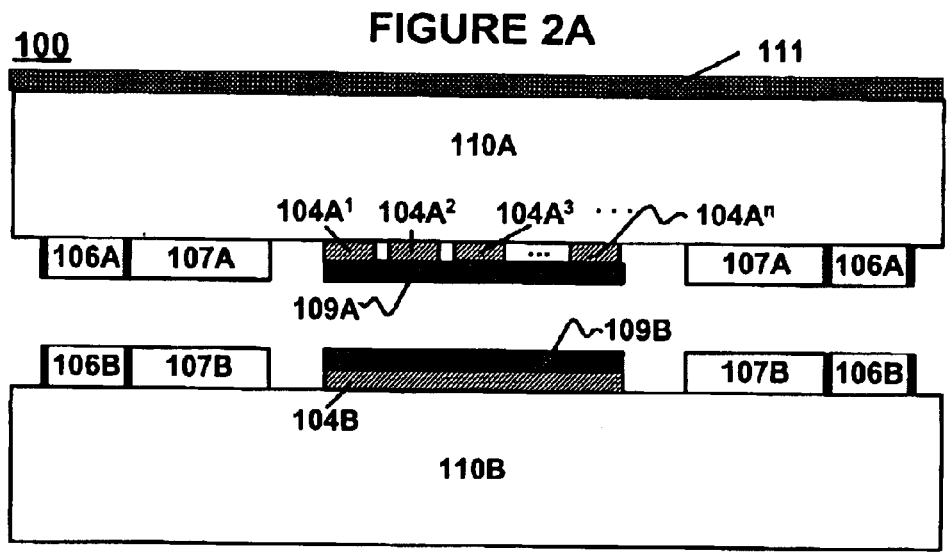
FIGS. 2a and 2b show example second embodiment multi-pixel liquid crystal cell platform having an integrated optical element that functions globally across multiple pixels.
Figure 2B:
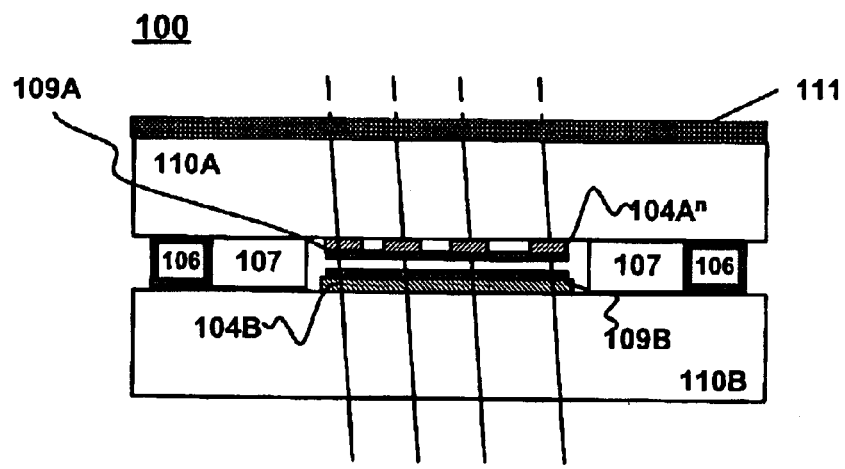

A second embodiment of the present invention includes an integrated optical element 111 and is presented in FIG. 2a and 2b, which shows a multi-pixel liquid crystal cell platform 100 having a first substrate 110A in opposition to a second substrate 110B wherein the first substrate contains a global integrated optical element 111 on one side of the substrate that performs an optical function across multiple pixel locations, a conductive electrode layer 104 patterned to form individual pixel locations $104A_1$ through $104A_n$, a liquid crystal alignment layer 109A, metal gasket element layer 106A and spacer element layer 107A on the opposing side, and, the second substrate 110B containing a common conductive electrode layer 104B spanning the pixels defined above, a liquid crystal alignment layer 109B, metal gasket element layer 106B and a spacer element layer 107B.

A variation of the second embodiment of the present invention is presented in FIG. 2c and 2d, which shows a multi-pixel liquid crystal cell platform 100 having a first substrate 110A in opposition to a second substrate 110B wherein the first substrate contains a global integrated optical element 111 on one side of the substrate that performs an optical function across multiple pixel locations, a conductive electrode layer 104 patterned to form individual pixel locations $104A^1$ through $104A_n$, a liquid crystal alignment layer 109A, a metal gasket element layer 106A, and a spacer element layer 107A. In this embodiment, the second substrate 110B contains a global integrated optical element 112 on one side of the substrate that performs an optical function across multiple pixel locations, a common conductive electrode layer 104B spanning the pixels defined above, a liquid crystal alignment layer 104B, metal gasket element layer 106B, and a spacer element layer 107B. In this embodiment, the integrated optical elements 111 and 112 may provide the same or different functionality, depending on the application. For example, in application defined by an array of free space variable optical attenuators, a transmissive cell 100 might be configured with a plurality of pixels $104^{1 \cdots n}$ formed from substrates having two polarizers transmitting perpendicular states of light, 111, 112, respectively. In an optical switching application, a reflective cell 100 may include a plurality of pixels $104^{1 \cdots n}$ formed from a first substrate having optical element 111 functioning as a polarization beam splitter and combiner, and the second substrate having optical element 112 functioning as a mirror.

Figure 3A:
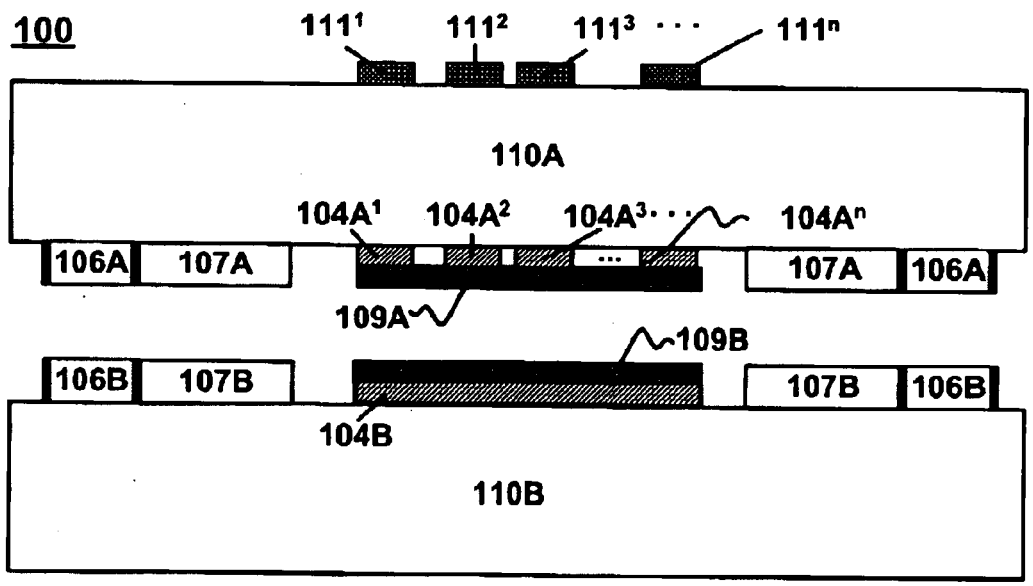
FIGS. 3a and 3b show example third embodiment multi-pixel liquid crystal cell platform having an integrated optical element on the first substrate that provides an optical function at each local pixel location.
Figure 3B:
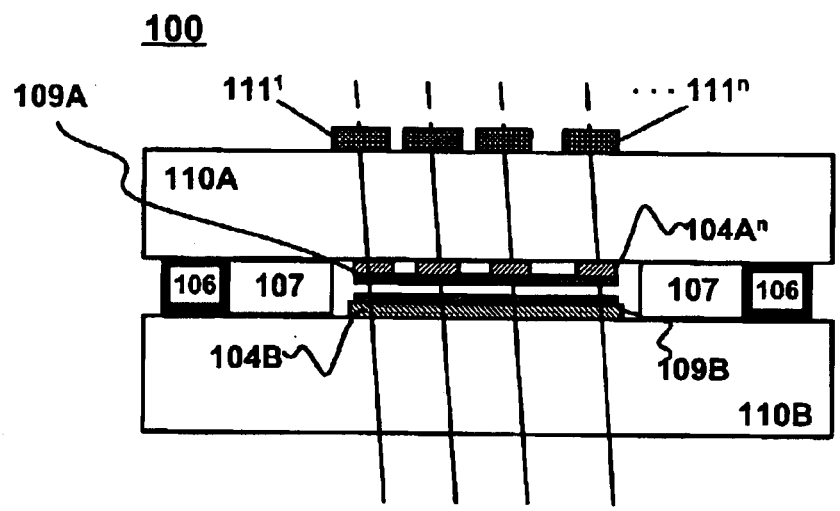

A third embodiment of the present invention is presented in FIG. 3a and 3b, which shows a multi-pixel liquid crystal cell platform 100 having a first substrate 110A in opposition to a second substrate 110B wherein the first substrate contains integrated optical elements 1111 positioned at referential pixel locations, a conductive electrode layer 104 patterned to form individual pixel locations $104A_1$ through $104A_n$, a liquid crystal alignment layer 109A, a metal gasket element layer 106A, and a spacer element layer 107A. In this embodiment, the second substrate 110B contains a common conductive electrode layer 1043 spanning the pixels defined above, a liquid crystal alignment layer 104B, metal gasket element layer 106B, and a spacer element layer 107B.

Figure 3C:
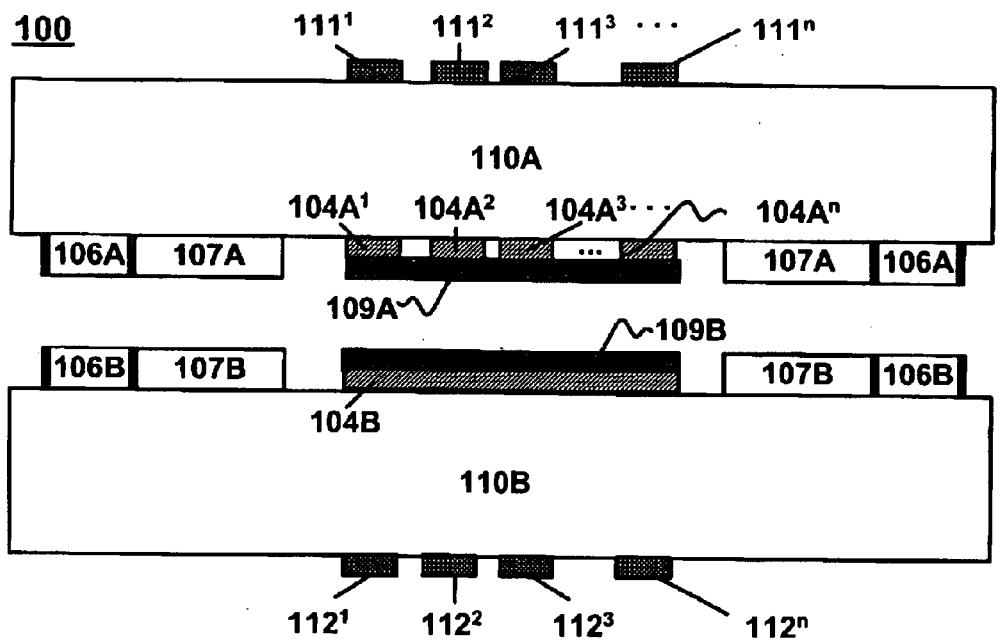
FIGS. 3c and 3d show example third embodiment multi-pixel liquid crystal cell platform having integrated optical elements on the first and second substrate that provide an optical function at each local pixel location.
Figure 3D:
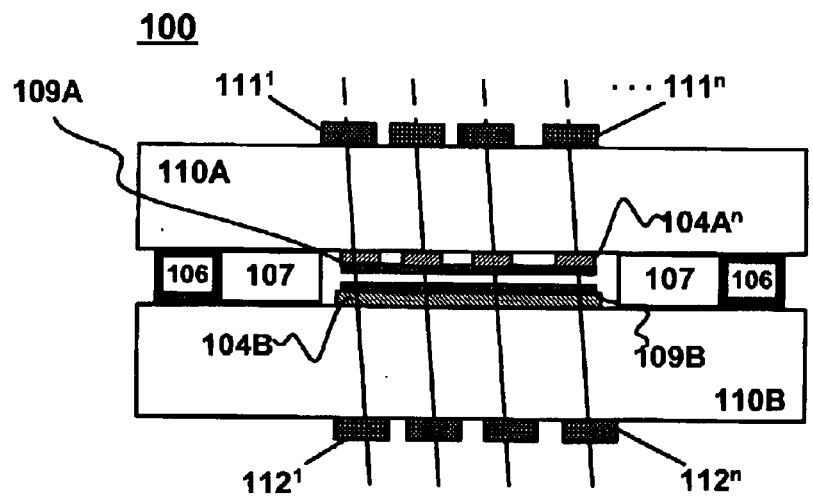

A first variation of the third embodiment of the present invention is presented in FIG. 3c and 3d, which shows a multi-pixel liquid crystal cell platform 100 having a first substrate 110A in opposition to a second substrate 110B wherein the first substrate contains integrated optical elements $111_n$ positioned at referential pixel locations, a conductive electrode layer 104 patterned to form individual pixel locations $104A_1$ through $104A_n$, a liquid crystal alignment layer 109A, a metal gasket element layer 106A, and a spacer element layer 107A. In this embodiment, the second substrate 110B contains integrated optical elements $112_n$ positioned at referential pixel locations, a common conductive electrode layer 104B spanning the pixels defined above, a liquid crystal alignment layer 109B, metal gasket element layer 106B, and a spacer element layer 107B. In this embodiment, the integrated optical elements $111^n$ and $112^n$ may provide the same or different functionality across pixels, depending on the application. For example, in an application that requires one pixel to perform as a free space variable optical attenuator and a second pixel to perform as a switching cell, a first transmissive pixel might be configured with two polarizers transmitting perpendicular states of light, $111^1$, $112_1$ while the second pixel may be reflective and include an optical element $111_2$ functioning as a polarization beam splitter and combiner, and optical element $112^2$ functioning as a mirror.

A second variation of the third embodiment of the present invention is presented in FIG. 3e and 3f, which shows a multi-pixel liquid crystal cell platform 100 having a first substrate 110A in opposition to a second substrate 110B wherein the first substrate contains integrated optical elements $111_n$ positioned at referential pixel locations, a conductive electrode layer 104 patterned to form individual pixel locations $104A^1$ through $104A^n$, a liquid crystal alignment layer 109A, a metal gasket element layer 106A, and a spacer element layer 107A. In this embodiment, the second substrate 110B contains a global integrated optical element 112 on one side of the substrate that performs an optical function across multiple pixel locations, a common conductive electrode layer 104B spanning the pixels defined above, a liquid crystal alignment layer 109B, metal gasket element layer 106B, and a spacer element layer 107B. In this embodiment, the integrated optical elements 111 and $112_n$ may provide the same or different functionality across pixels, depending on the application. For example, in an application that requires one pixel to perform as a free space variable optical attenuator and a second pixel to perform as a switching cell, a first transmissive pixel might be configured with two polarizers transmitting perpendicular states of light, $111^1$, $112^1$ while the second pixel may be reflective and include an optical element $111^2$ functioning as a polarization beam splitter and combiner, and optical element $112^2$ functioning as a mirror.

An active thermal element, integrated heater and temperature sensor device may be sandwiched between the first and second substrates, 110A and 110B, to provide uniform heating and temperature sensing across the multiple pixels in the array. FIG. 3g and 3h show the integrated heater and temperature device 108 as applied to continuing example second variation of the third embodiment as previously described however it need be stated that the integrated heater and temperature sensor device may be integrated into all embodiments and variations of the present invention as will be described in the detailed process flow.

A library of pixel constructs designed to perform specific optical functions is presented in FIG. 4 in which a dotted box is used to highlight the pixel constructs and show the path of an optical signal passing through the pixel. For each pixel construct, various configurations are shown as they relate to the various embodiments and configurations of the present invention. Common features outlined the FIG. 4 are enumerated in FIG. 4A[a–d] only. For clarity sake, only new features embodied by a pixel construct shall be enumerated in the following pages of FIG. 4.

Figure 4A:
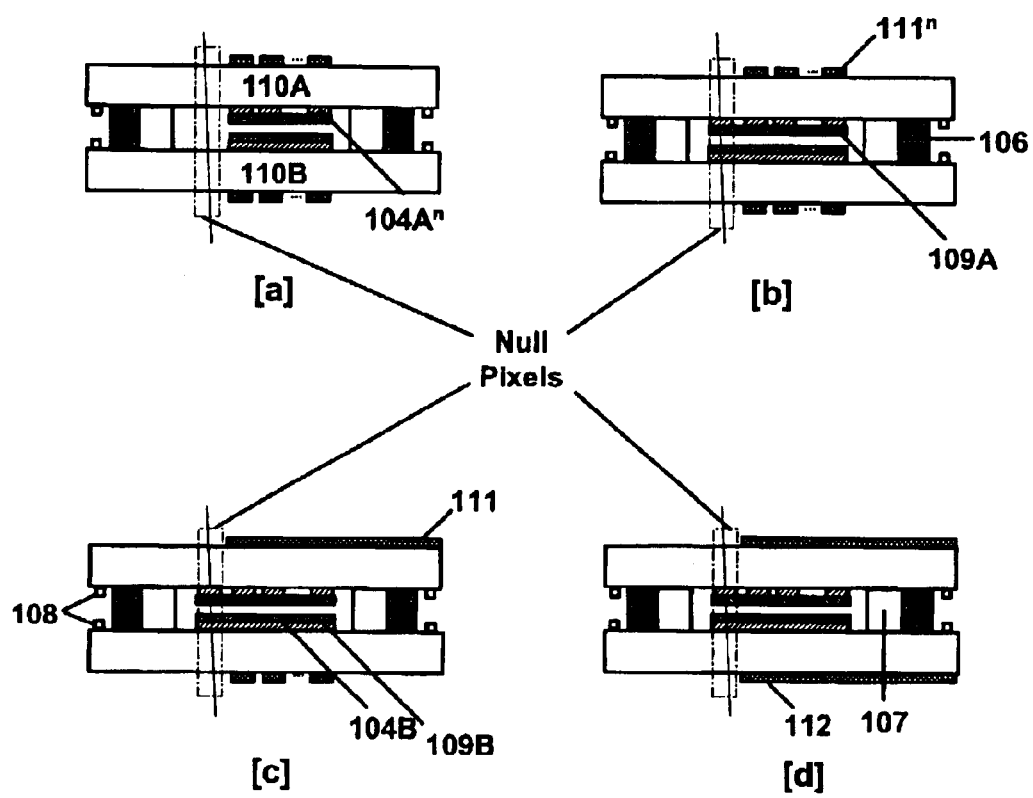
FIG. 4A shows various null pixel constructs designed to perform substantially no optical manipulation of light other than the polarization rotation capability provided by the liquid crystal capability demonstrated in subfigures [b], [c] and [d].

FIG. 4A shows various null pixel constructs designed to perform substantially no optical manipulation of light other than the polarization rotation capability provided by the liquid crystal capability demonstrated in subfigures [b], [c] and [d]. As shown, the electrode and alignment layers .104 and 109 may be omitted in a null pixel construct, and the integrated optical elements may be masked off or omitted at each null pixel.

FIG. 4B shows various mirror pixel constructs designed to fully reflect an optical signal off the mirror pixel. The mirror 23 may be a plasma enhanced chemical vapor deposition (PECVD) of gold and be located on the same plane as the electrode layer 104 as shown in sub figure [a]. An electrically conductive common mirror 23 may extend across multiple pixels and replace the ITO layer as shown in sub figure [b]. The mirror may be deposited at a referential pixel location on the outer surface of substrate 110B as shown in sub figure [c]. An optical element may be positioned over the mirror pixel on the first substrate 110A. Sub figure [d] shows a global optical element that spans multiple pixels on the first substrate 110A in a mirror pixel of sub figure [c].

Figure 4C:
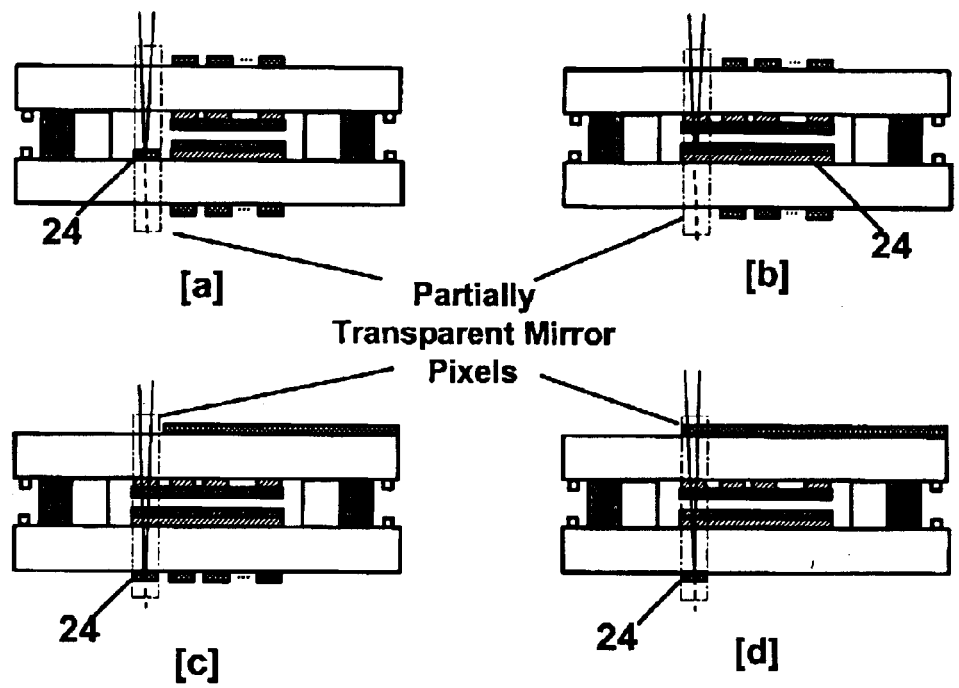
FIG. 4C shows various partially transparent pixel constructs designed to partially reflect an optical signal off the partially transparent pixel.

FIG. 4C shows various partially pixel constructs designed to partially reflect an optical signal off the partially transparent pixel. The mirror 24 may be a PECVD deposition of gold and masked to allow a percentage of light through the cell. The mirror 24 may be located on the same plane as the electrode layer 104 as shown in sub figure [a]. An electrically conductive common mirror 24 may extend across multiple pixels and replace the ITO layer as shown in sub figure [b]. The mirror may be deposited at a referential pixel location on the outer surface of substrate 110B as shown in sub figure [c]. An optical element may be positioned over the mirror pixel on the first substrate 110A. Sub figure [d] shows a global optical element that spans multiple pixels on the first substrate 110A in a mirror pixel of sub figure [c].

Figure 4D:
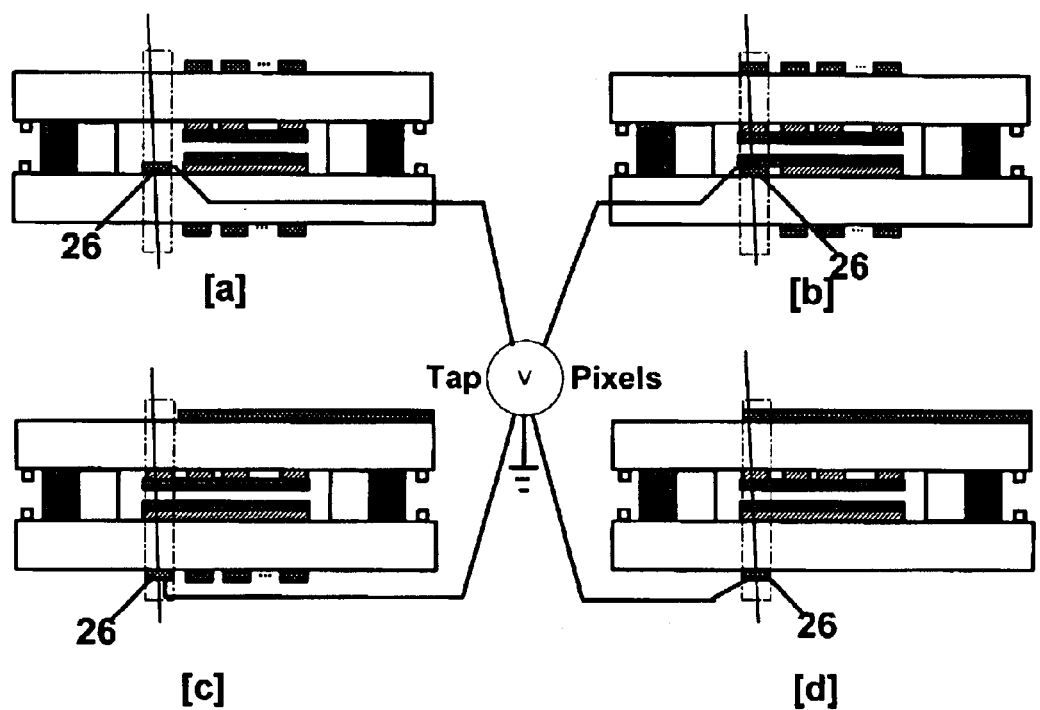
FIG. 4D shows various tap pixel constructs designed to generate a voltage in response to an optical signal passing through the tap pixel.

FIG. 4D shows various tap pixel constructs designed to generate a voltage in response to an optical signal passing through- the tap pixel. The tap 26 may be a PECVD deposition of photovoltaic material, such as gallium arsenide, suitable to create a voltage when exposed to incident light. The tap may be connected through a via and routed to a contact pad to enable access to the electronic signal (not shown). Tap 26 may be located on the same plane as the electrode layer 104 as shown in sub figures [a] and [b]. The tap may be deposited on the outer surface of substrate 110B as shown in sub figures [c] and [d].

Figure 4E:
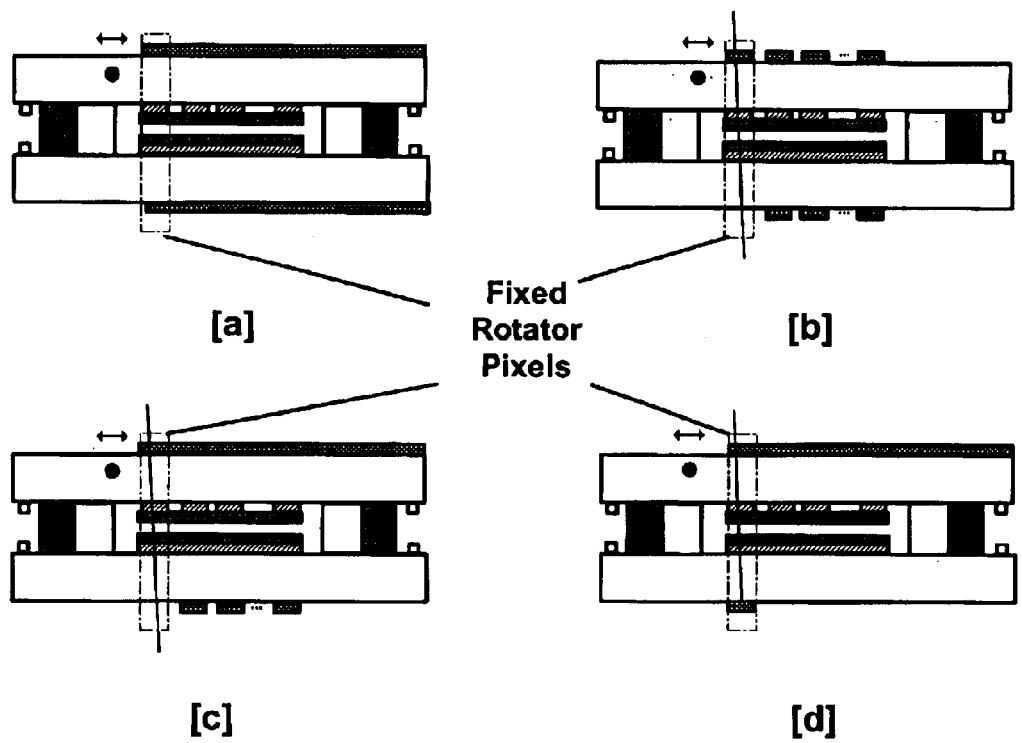
FIG. 4E shows various fixed rotator pixel constructs designed to rotate the polarization of an optical signal passing through the fixed rotator pixel by a fixed degree.

FIG. 4E shows various fixed rotator pixel constructs designed to rotate the polarization of an optical signal passing through the fixed rotator pixel by a fixed degree. A fixed rotator pixel is formed by way of optical element 111 providing a waveplate function that produces a fixed degree of polarization rotation to the light as it passes through the optical element 111 into substrate 110A. Optical element 111 is preferably a nanostructured grating.

Figure 4F:
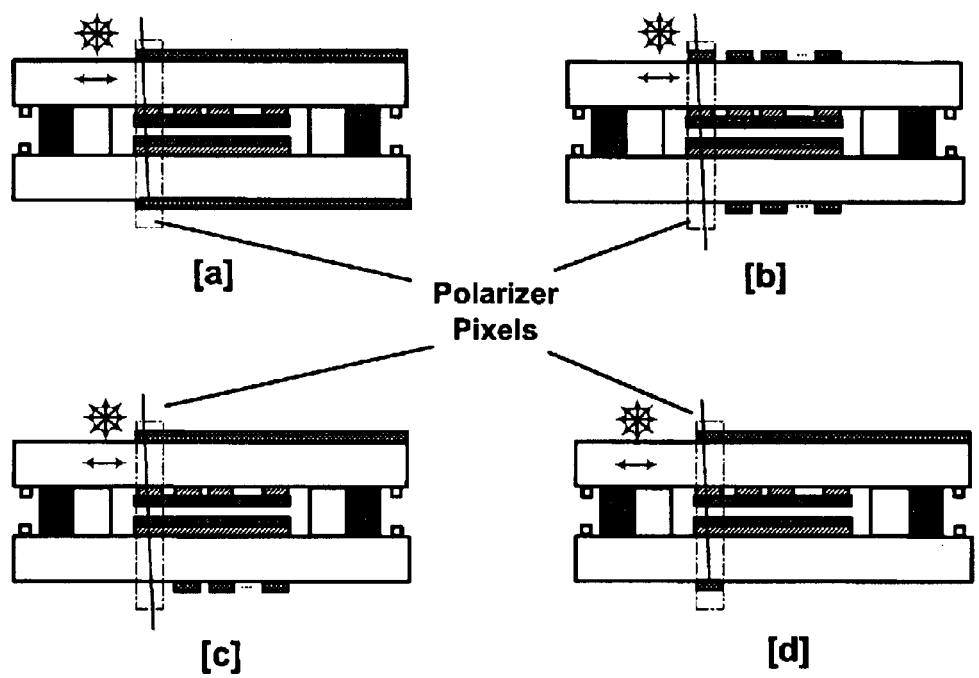
FIG. 4F shows various polarizer pixel constructs designed to pass a specific polarization of the optical signal passing through the polarizer pixel.

FIG. 4F shows various polarizer pixel constructs designed to pass a specific polarization of the optical signal passing through the polarizer pixel. Preferably, the optical element 111 is a nanostructured grating polarizer masked and designed to provide specific polarization at referential pixel locations as outlined in sub figures [a] and [b], or optical 111 is a global nanostructured grating polarizer providing the same polarization selectivity across multiple pixels in the array as shown in sub figures [b] and [c].

Figure 4G:
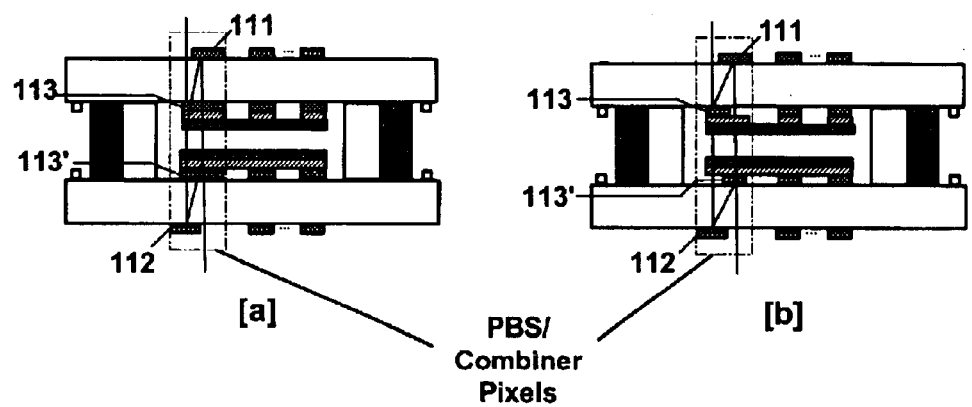
FIG. 4G shows various polarization beam splitter (PBS)/combiner pixel constructs designed to split the incoming light signal into two polarizations and recombine the outgoing light into a single beam.

FIG. 4G shows various polarization beam splitter (PBS)/combiner pixel constructs designed to split the incoming light signal into two polarizations and recombine the outgoing light into a single beam. The PBS/combiner pixel construct may form a polarization independent variable optical attenuator that may be controlled by the electronic system of the present invention. Sub figure [a] shows a PBS/combiner pixel formed by way of optical element 113, a nanostructured polarization beam splitter grating applied under the liquid crystal alignment layer and reflecting orthogonally polarized light while passing light polarized parallel to itself. Light orthogonally polarized with respect to optical element 113 is reflected to optical element 111 that is positioned on the outer surface of substrate 110A and that rotates and reflects the signal to optical element 113' which recombines the output signal with the parallel light initially passed through optical element 113 and reflected of optical element 112, a rotating mirror positioned on the outside of substrate 110B. Sub figure [b] shows a PBS/combiner pixel formed by way of optical element 113, a nanostructured polarization beam splitter grating applied under the liquid crystal alignment layer and reflecting orthogonally polarized light while passing light polarized parallel to itself. Light orthogonally polarized with respect to optical element 113 is reflected to optical element 111 that is positioned on the outer surface of substrate 110A and that reflects the signal to optical element 113 ' which recombines the output signal with the parallel light initially passed through optical element 113 and reflected of optical element 112, a mirror positioned on the outside of substrate 110B.

Figure 4H:
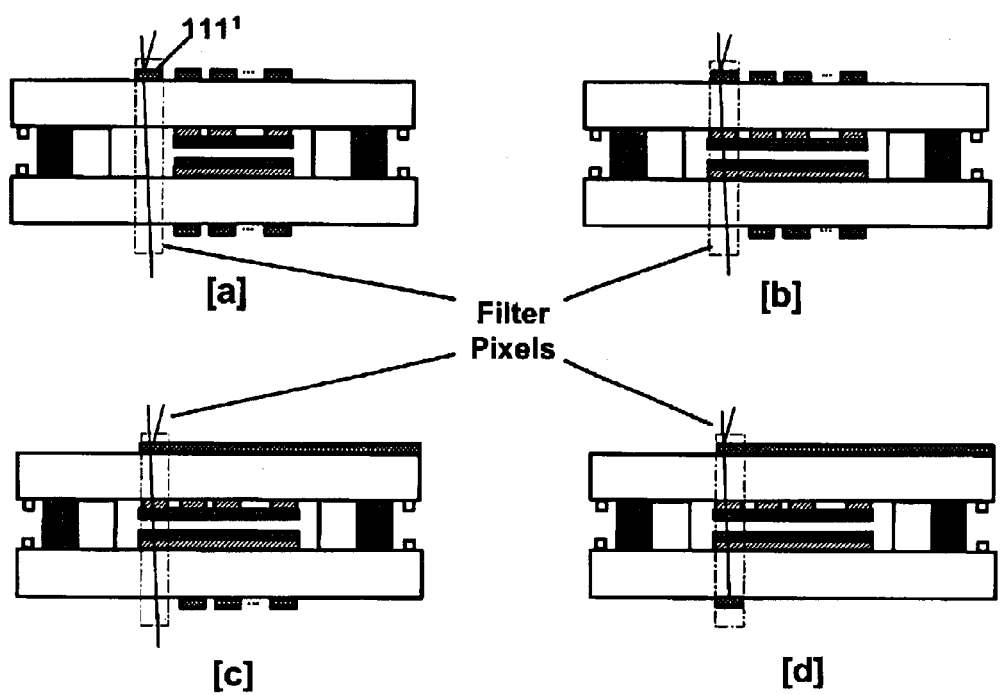
FIG. 4H shows various filter pixel constructs designed to provide filtration of light passing through the filter pixel.

FIG. 4H shows various filter pixel constructs designed to provide filtration of light passing through the filter pixel. Sub figures [a] and [b] show local optical elements $111_n$ positioned over each pixel location and providing an optical filter capability. The optical element filters $111^n$ may be cutoff filters or bandpass filters, depending on the application. The filters may be thin films designed with high Q to pass specific wavelengths of light. Each pixel location may have a different filter associated therewith. The filter optical elements $111^n$ may have different filter values associate therewith and further be formed by a single masked nanostructured grating with different surface relief patterns associated with each pixel, each filter. Sub figures [c] and [d] show a global optical element 111 that span multiple pixels.

Figure 4I:
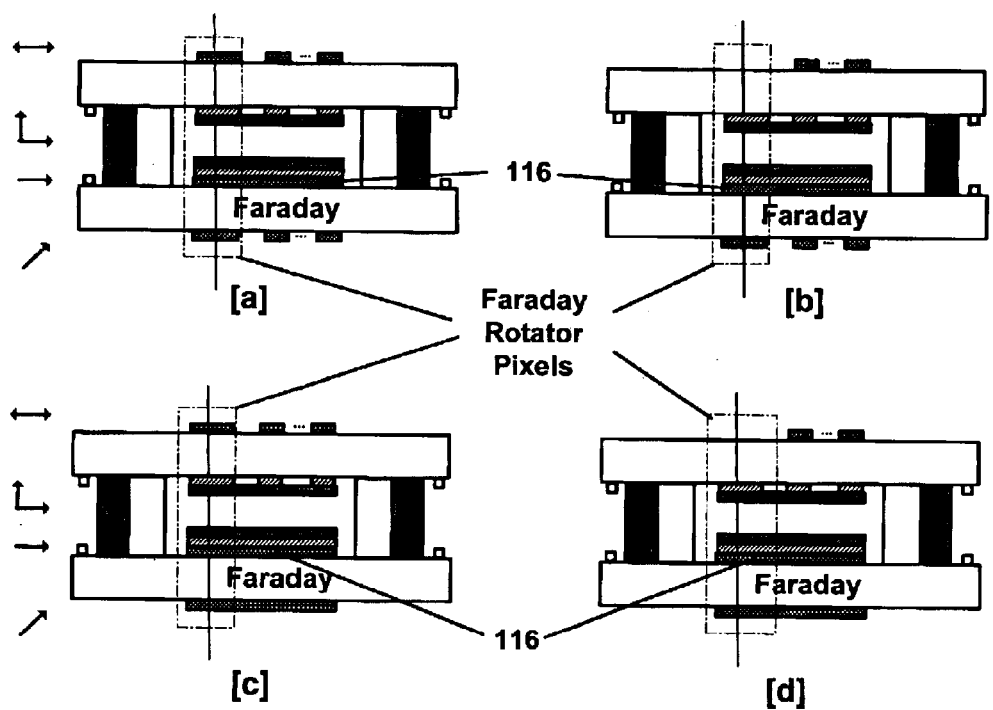
FIG. 4I shows various Faraday rotator pixel constructs designed to provide attenuation and isolation of a light signal as it passes through the Faraday rotator pixel.

FIG. 4I shows various Faraday rotator pixel constructs designed to provide attenuation and isolation of light signal as it passes through the Faraday rotator pixel. The Faraday rotator pixel construct may form a polarization dependent variable optical attenuator with integrated isolator. In sub figures [a]–[d], an optical signal passing through the pixel passes through the liquid crystal material that may controllably rotate the optical signal by substantially 0 to 90 degrees. An optical element 116 polarizer is positioned adjacent to the substrate 110B. The liquid crystal electrode and alignment layers sit on top of the polarizer optical element. The polarizing optical element may be a nanostructured grating etched into the substrate 110B. Substrate 110B must be made from a material capable of performing a Faraday rotation function, such as rare earth doped Garnet.

With respect to all embodiments, it is generally preferable that substrate 110 be comprised of glass but other substrate materials, including Garnet, silicon, polymers, etc., may be suitable depending on the pixel constructs and applications.

Figure 5:
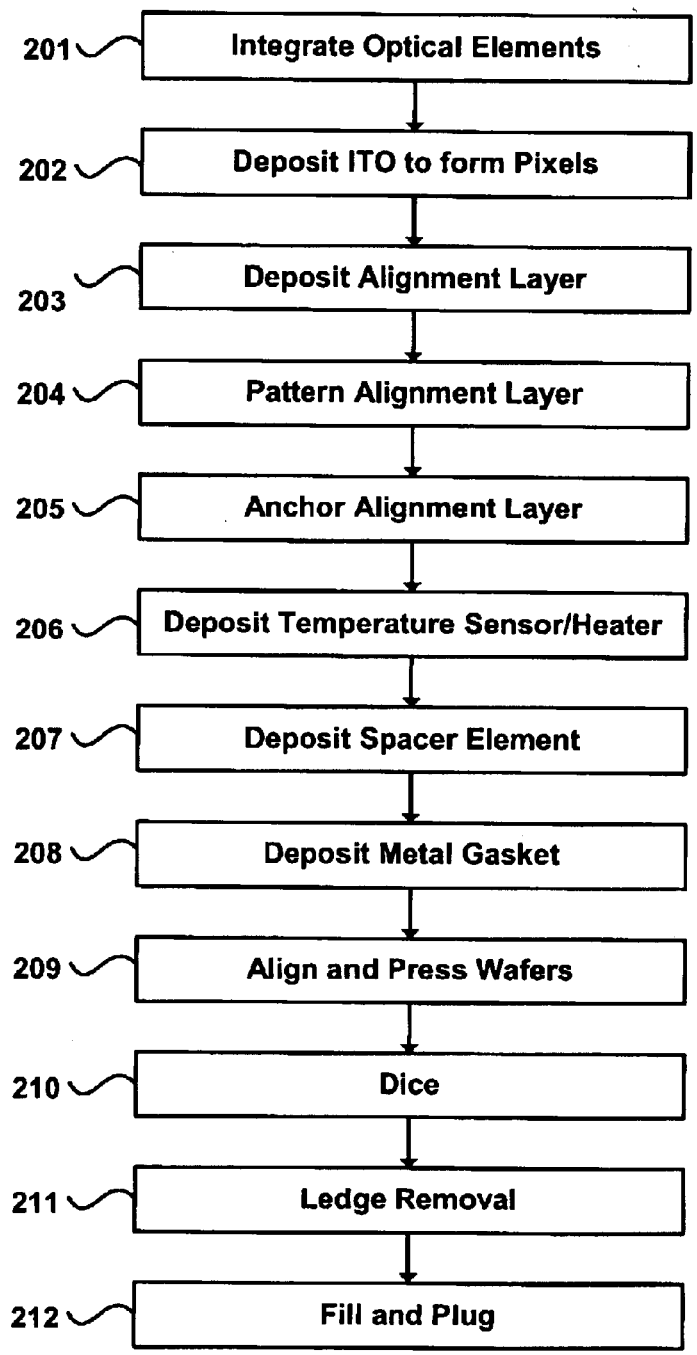
FIG. 5 shows one process flow for fabricating the liquid crystal cells of the present invention.

FIG. 5 shows one example fabrication process to create the liquid crystal cell platform 100. Various optional steps may be omitted depending on the embodiment of configured features.

With respect to FIG. 5, optional step one involves integrating the optical elements into the first and/or second substrates. The optical element may function as a polarizer, beam splitter, filter, thin film, polarization beam splitter, waveguide, waveplate, combiner, mirror, partially transparent mirror, isolator, detector, grating, subwavelength grating, nanostructure, or some combination thereof and including those optical functions presently known in the art. Preferably, the optical element is a nanostructured grating feature, such as those described by NanoOpto Corporation of New Jersey. The grating feature may be integrated into the inner and/or outer substrates 110A or 110B, or onto both substrates depending on the application. All optical elements, including those referred to as 111 and 112, may be patterned with a nanostructured gratings and masked such that a specific optical function may be defined at referential pixel locations $104^1 \ldots 104^n$.

With respect to process step 201, the substrates are etched using nanoimprint lithography or similar methods known in the field based on impressing a reference mask into photo resist to create surface relief patterns on the substrate where the surface relief photo resist pattern is etched to form grating features in the nanometer range. A uniform mask may be used to pattern a global optical function across multiple pixels or the mask may be designed to provide local optical functions at referential pixel locations based on changing the period and size of the relief structures. The optical elements may be integrated into the inner and/or outer surfaces or the first and/or second substrates, depending on the pixel construct under development. Alternately, the optical element may be supplied as a discreet chip and bonded to the target substrate by way of epoxy or other methods described herein or otherwise generally known. In the case where an array of optical elements having different optical functions are required for each pixel and where the use of nanoimprint lithography does not provide the required optical function, the substrate may be iteratively processed such that multiple PECVD deposition stages are performed to apply the appropriate optical elements onto the substrates. The optical element may be deposited directly on the inner or outer surface of either substrate, or both. Finally, the optical element itself may be integrated into the substrate by way of choice of substrate material. For example, the substrate 110A, 110B or both substrates may be made of Polarcor, a linearization polarization glass made by Corning, Inc.

Figure 6A:
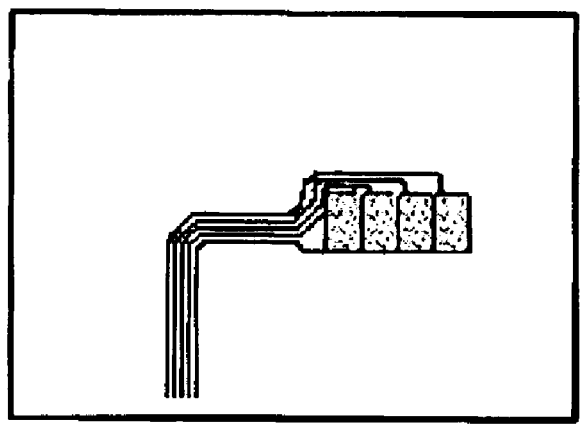
FIGS. 6A and 6B show example four pixel indium tin oxide (ITO) electrode forming masks of the present invention.
Figure 6B:
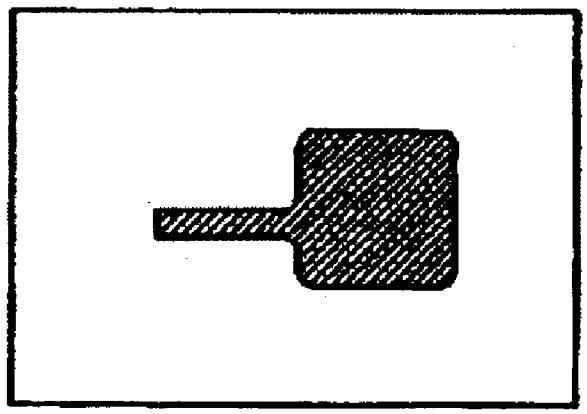

Step two involves adding the appropriate ITO (or other transparent conductive material) patterns to the first and second glass substrates to form the liquid crystal electrodes. With respect to process flow 202 of FIG. 5, a standard PECVD process may be used to apply thin film of ITO approximately 100 angstroms thick. FIGS. 6A and 6B show example ITO masks that may be used to pattern substrates 110A and 110B, respectively.

Step three involves adding a polyimide alignment layer to the first and second glass substrates. With respect to process flow 203 of FIG. 5, standard spin coating stepped processes may be used at room temperature to create a layer of polyimide approximately 600 angstroms thick on each substrate.

Step four involves patterning the polyimide layer. With respect to process 204, photo resist may first be applied to the substrates and masked using traditional photolithography techniques or laser etching may be used to pattern the substrates. Wet or dry etching performed thereafter may result in a pattern of polyimide.

Step five involves anchoring the liquid crystal alignment layers. With respect to process step 205, one traditional method is to rub the polyimide of each substrate to form the alignment layers. In a twisted nematic configuration, the rubbing direction of the first substrate may be orthogonal to the rubbing direction of the second substrate. In an electronically conductive birefringence (ECB) configuration, the rubbing direction of the first substrate may be parallel to the rubbing direction of the second substrate. Various anchoring schemes may be define rub angles other than 0 or 90 degrees. An alternate method of forming the alignment layers is to employ an imprint lithography technique where a reference mask is pressed onto a deposited photo resist layer to create surface relief patterns in the photo resist which is subsequently etched to form high precision alignment grooves with nanoscale tolerance.

Steps three, four and five as mentioned above may be replaced by an alternative preferred anchoring step that involves the use of a photo sensitive anchoring medium, such as Staralign by Vantio of Switzerland. The photosensitive anchoring medium may be spin applied to the substrates 110A and 110B and masked to achieve specific anchoring energy and direction. UV light masking of various patterns, including specific directional application may be used to form individual pixels. Pixels may be formed with different rub characteristics, depending on the application.

Figure 7A:
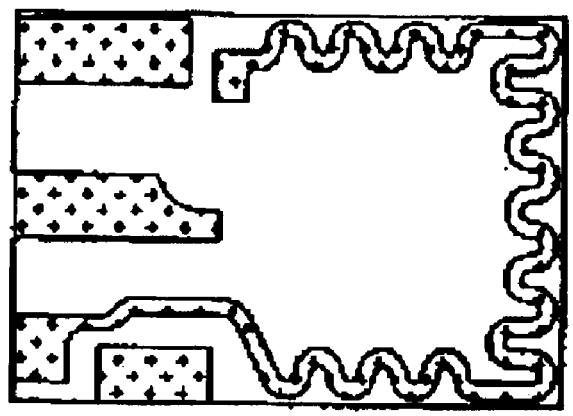
FIGS. 7A and 7B show example integrated active thermal element forming masks of the present invention.
Figure 7B:
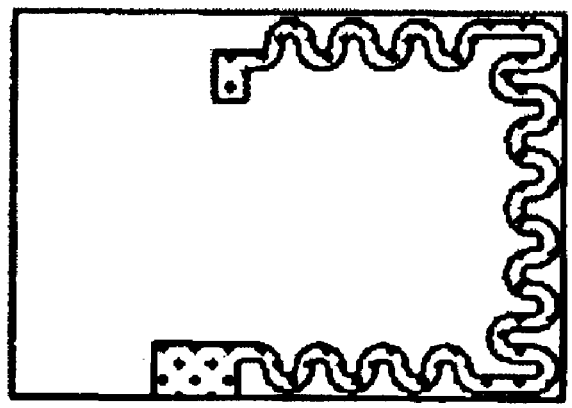

Optional step six involves creating the active thermal element, integrated heater and temperature sensor. FIGS. 7A and 7B show example masks that may be use with respect to process step 206 of FIG. 5, in which a seed adhesion layer of chrome is first deposited approximately 200 angstroms thick onto the substrates, followed by a PECVD deposition thin film platinum resistor layer approximately 2000 angstroms thick and forming the upper and lower portions of the integrated heater/temperature sensor. The upper and lower portions of the integrated device, applied to substrates 110A and 110B, may be separated by an air gap approximately 9.6 microns and interconnected by VIAS formed from a metal deposition step that will be described in succeeding step eight. Again, it need be stated that gap thickness is delineated for example purposes and will change depending on the desired application. It should be stated that, depending on the configuration, the platinum thin film resistor may be patterned in various shapes, including but not limited to arched, curved, circular, zigzag, stripped as well as the serpentine pattern of FIG. 7A and 7B. Given the resistivity of the thin film platinum, approximately 10.6E-8 ohm meters, the example shown yields approximately 100 ohms resistance at room temperature.

Figure 8A:
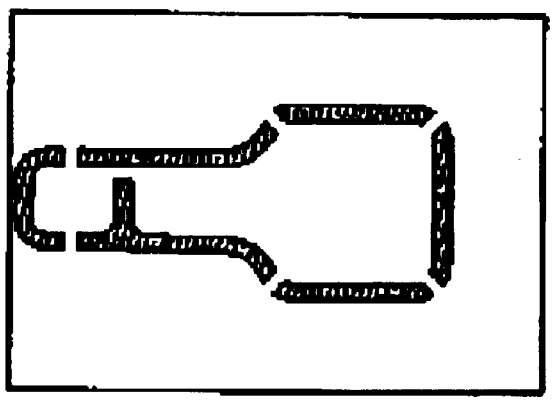
FIGS. 8A and 8B show example spacer element forming masks of the present invention
Figure 8B:
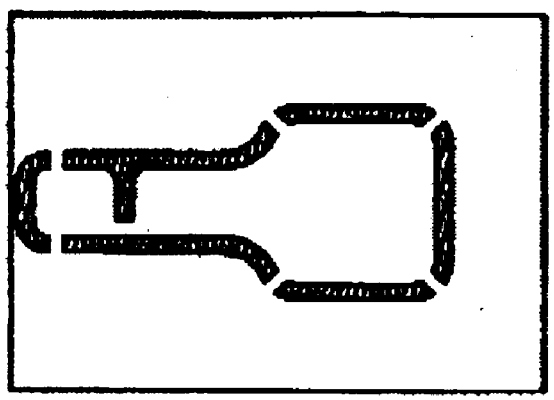

Step seven involves creating the spacer element 107. Spacer element 107 controls the gap thickness of the liquid crystal cell. While it is not necessary to equally distribute the spacer element equally on each substrate, it is preferred that one half of the desired gap thickness of the completed cell shall define the thickness of the spacer element 107 as deposited on each substrate. The combined cell 100 gap thickness may therefore be formed with a tolerance based on the deposition process. Silicon dioxide is the preferred material for creating the spacer element, however other materials such as aluminum oxide, silicon nitride, silicon monoxide and other materials compatible with thin film deposition processes that do not substantially compress may also be used as an alternative to the silicon dioxide provided they are compatible with the selected liquid crystal substrate material. FIGS. 8A and 8B show an example mask that may be used to perform the process step 207 of FIG. 5, where a patterned layer of 5 microns thick of silicon dioxide is deposited onto each substrate.

Figure 9A:
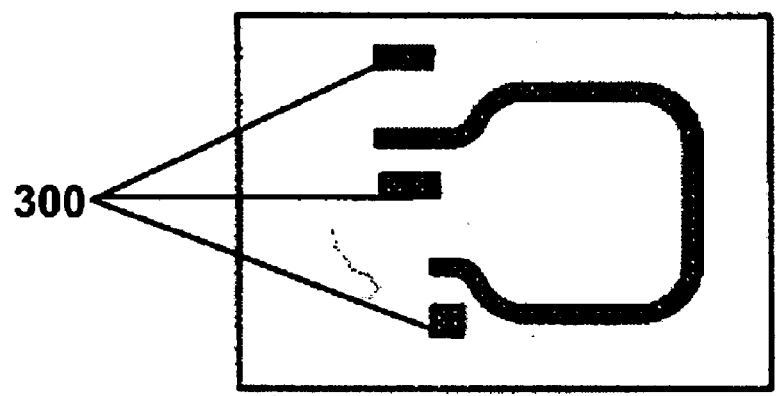
FIGS. 9A and 9B show example masks for defining a metal gasket element layer of the present invention.
Figure 9B:
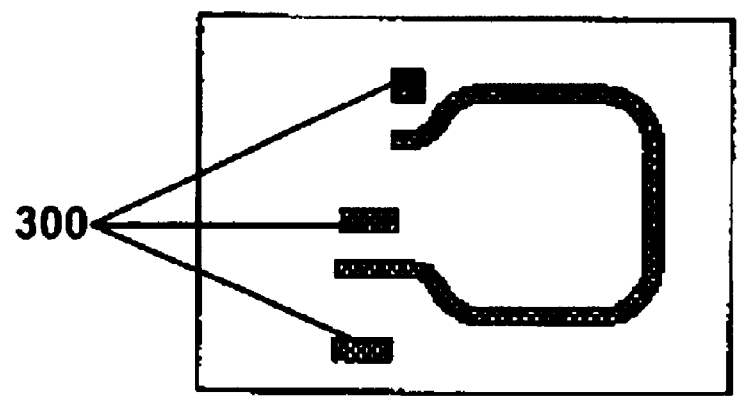

Step eight involves creating the metal gasket element 106. Metal gasket element 108 may be made from a variety of metals, including but not limited to, indium, gold, nickel, tin, chromium, platinum, tungsten, silver, bismuth, germanium and lead. However it is preferable to use indium because of its pliability and relatively low melting temperature. FIGS. 9A and 9B show example masks that may be used to perform process step 208 of FIG. 5, where, for the continuing example purpose, a layer approximately 7 to 9 microns thick of indium may equally be deposited on each substrate. It is generally preferable that metal gasket layer of this process step is deposited thicker than the spacer element of the previous step due to seepage that occurs during the additional processing steps. Metal gasket masks, such as those shown in FIGS. 9A and 9B, may be configured to form referential VIAS 300 that enable electrical interconnection between features deposited on either substrate 110A or 110B. VIAS 300 may also be formed to simplify routing external contact pads to the temperature sensor and heating element. For example the VIAS 300 of the present example are positioned to overlap the heater/temperature sensor platinum layer defined in step six. They are also positioned to overlap the ITO layer so as to define contact pads to drive the two electrodes of the liquid crystal cell.

Step nine involves aligning and pressing wafers 110A together with 110B. It is known that visual alignment reference marks may be etched into the underlying wafer, or that a physical feature of the glass sheet such as an edge or alignment hole may be used to perform wafer alignment. However, a high yield method of accurately aligning the relative position of the two glass substrates without the need for expensive high precision alignment equipment is hereby presented, in which complimentary interlocking geometric features deposited on each substrate, mate with each other to prevent relative movement of the glass sheets during the bonding and pressing process. Such interlocking features mitigate any non uniformity in the bonding process and given that the typical gap between two glass sheets of a liquid crystal cell is less than 20 micrometers, thin film deposition or screening processes can be used to create precisely controlled and repeatable geometric features. With respect to process step 209 of FIG. 5, the substrates 110A and 110B may be brought together, aligned under pressure at room temperature to form a chemical bond metal gasket at the gap distance defined by the sandwich spacer elements formed from both substrates.

Step ten involves dicing of the wafers. Process step 210 of FIG. 5 may be performed using a dicing saw or via etching techniques.

Figure 10A:
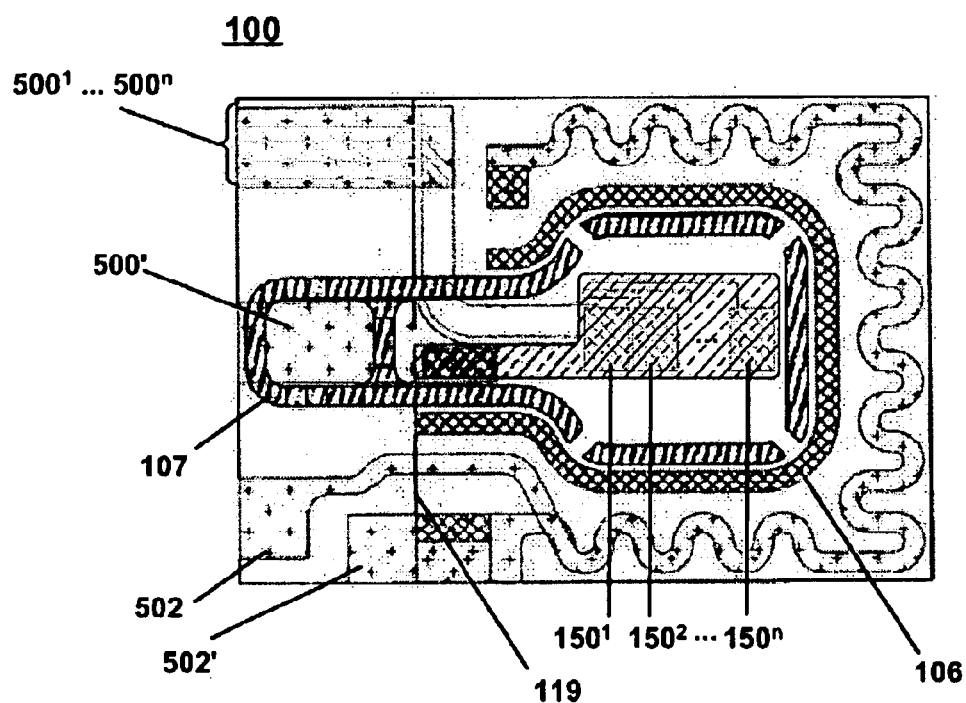
FIG. 10A shows an example top view integrated perspective showing the relationship between various layers of a one dimensional (1×N) array configuration of the present invention.
Figure 10B:
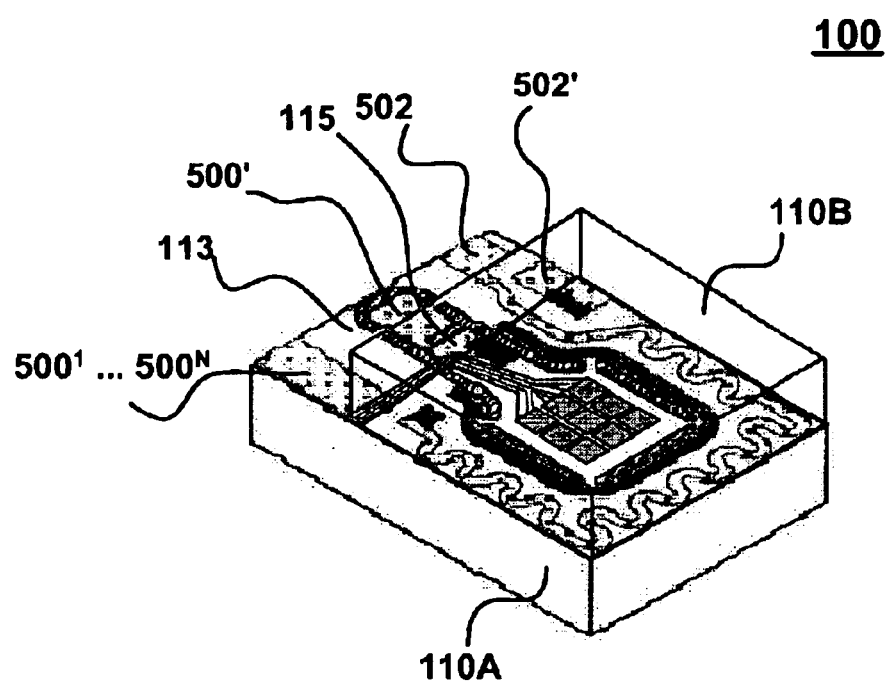
FIG. 10B is an isometric view showing a nine pixel (N×M) two dimensional liquid crystal cell at the termination of the fabrication process.

Step 11 involves removal of a portion of protective glass on the liquid crystal cell. FIG. 10A shows a top perspective of the various layers that combine through the substrates when interposed thereupon each other in a fully configured embodiment of the present invention. With respect to process 211 of FIG. 5, the substrate 101B is scored using a diamond dicing saw to cut a trench approximately 90% through the thickness of the substrate and forming the break off line 119 of FIG. 10A. A portion of the substrate 110B is broken off along the break off line 119 to define an access surface 113 of FIG. 10B that provides access to the underlying liquid crystal electrode contact pads 500 and 500', the underlying liquid crystal heater/temperature sensor element electrical contact pads 502 and 502', as well as to the liquid crystal fill port 115.

Step 12 involves filling the liquid crystal device with a liquid crystal molecules, process 212 of FIG. 5. This step may be performed using traditional methods of filling a liquid crystal cell, whereby the cell is placed in a vacuum, a droplet size of liquid crystal material is placed at the fill port 115, and with the release of the vacuum, equilibrium pressure forces the liquid crystal material into the fill port 115 and the fill port is plugged. Several techniques to cap the fill port, including UV curable epoxy which may be used to close the fill port.

The present invention includes various liquid crystal configurations designed to function in a variety of specific optical systems and applications. More specifically, the basic cell platform including the metal gasket, spacer element and optional active thermal element may be tailored for specific optical applications, including liquid crystal optical switches, polarization independent variable optical attenuators, wavelength selector switches, optical multiplexers and demultiplexers, tunable filters and flexible optical add drop multiplexers.

Upon review of the previous and succeeding material, it will be clear to one skilled in the art that the basic liquid crystal cell process could be tailored to address various novel optical paths and applications defined in further detail in the following sections.

Optical Switching

The basic liquid crystal cell platform may be tailored to address a novel optical switching application now described in further detail.

The optical switching architectures described herein are examples of how a novel integrated liquid crystal platform can be reconfigured to enable a 1×2 switch, a 2×2 switch, or an array of these. A single switching construct is comprised of a single liquid crystal cell with optical elements deposited on the interior and exterior surfaces of the cell substrates. By aligning this small liquid crystal cell between the appropriate number of collimators, lensed fibers or collimator arrays, this design allows attenuation or switching functionality to be achieved within a single highly integrated component.

A liquid crystal switching cell is comprised of two pieces of glass substrates coated with transparent conductive electrodes on the inner surfaces, which are in turn coated with polymer alignment layers, sealed together, and filled with liquid crystal material. The entire assembly rotates the polarization of incident light by retarding one component of the beam by a different amount than the orthogonal component. In order to create a low loss switch, the incident polarizations must have the correct orientation relative to the alignment angle of the liquid crystal molecules.

The designs shown in FIG. 13 illustrate the use of polarization beam splitting, quarter wave plates and mirror optical elements to form a polarization splitting and combining pixel. In this case, the cells will be fabricated with an optical element polarization beam splitting nanostructured grating on the inner surfaces and mirrors and wave plate optical elements (the combination will be referred to as rotating reflectors hereafter) on the outer surfaces.

All of the architectures shown above share a common beam splitting function. Light enters the system through a collimator. After passing through the glass substrate, the beam encounters the first polarization splitting (PBS) structure, which reflects one polarization and passes the orthogonal state. The reflected portion of the beam passes through the substrate again and then is reflected and rotated so that when it encounters the PBS nanostructure again, this time it passes. Both components of the original beam are now in the liquid crystal material and can be actively rotated to any polarization.

FIG. 13 and 14 show a 2×2 switch in two liquid crystal states. In FIG. 13 the liquid crystal does not rotate polarization so the beams pass through the liquid crystal unchanged, reflect off of a second perpendicular PBS, pass through the liquid crystal unchanged again, are transmitted through the original PBS and back through the glass substrate. The beam that encountered the reflecting rotator during the original beam splitting process heads straight to the output collimator. The other beam hits a rotating reflector, bounces back to the PBS for one more reflection to be combined with the other beam at the output collimator. Each beam travels the same distance and encounters all of the same birefringent materials to minimize polarization mode dispersion (PMD) and PDL.

FIG. 14 shows the liquid crystal in an alternate state, it rotates the incident beams by 90°. This causes the beams to pass through (rather than reflect from) the second PBS. The beams are combined the same way as they were split. One travels directly to the collimator and the other is rotated and reflected and directed towards the same output collimator.

Subtracting the second input collimator of the liquid crystal cell turns the device from a 2×2 switch into a 1×2 switch since the path of the second input is the mirror image of the path of the first input signal.

Polarization Independent VOA

The basic liquid crystal cell platform may be tailored to address a novel polarization independent VOA applications that are now described in further detail.

Figure 15:
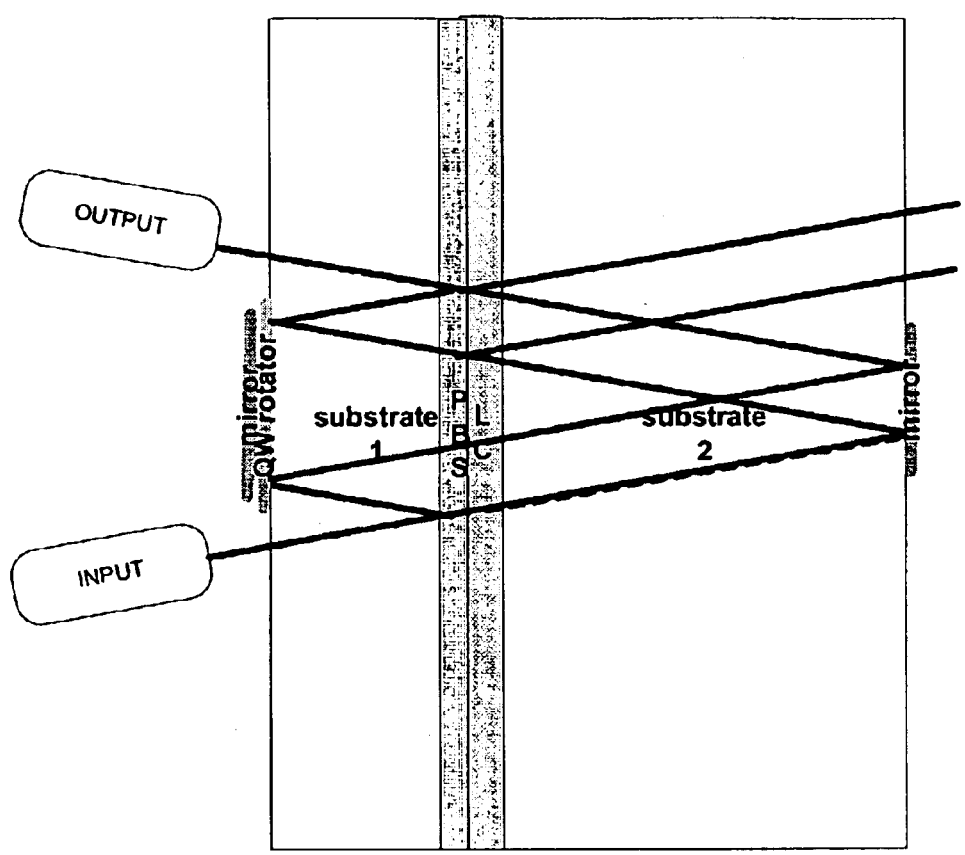
FIG. 15 shows the liquid crystal platform configured into a polarization independent variable optical attenuator.

FIG. 15 shows a polarization independent VOA, which is very similar to the switch architecture just described but is not symmetrical. The left half of the cell is identical to the switch cell. It consists of a glass substrate with a rotating reflector on the exterior surface and a PBS on the interior surface. The input and output collimators are also on this side of the cell. The difference between the switch and the VOA cell lies in the other half of the cell. This substrate is thicker, it has no PBS, and the exterior surface has a simple mirror rather than a rotating reflector.

In this device, the input beam is split into its two orthogonal components as before and both beams encounter the liquid crystal material. Now rather than the liquid crystal only rotating the polarization 0° or 90°, it will also rotate by any intermediate angle. Regardless of the amount of rotation, all of the light passes through the second substrate, is reflected by the mirror and makes a second pass through the liquid crystal where is rotated again by the same amount as before. Now, when it reaches the PBS, the fraction of light left unrotated is transmitted and the rest is reflected. The transmitted portion is combined by a rotating polarizer and PBS in the same fashion as the optical switch example. The reflection portion of light passes through the liquid crystal, the back substrate and then out the back surface of the cell. The fraction of light that is rotated determines how much the output signal is attenuated. More rotation means more light is discarded out the back surface and the more the input signal is attenuated on its way to the output collimator.

Polarization Independent VOA with Default State

The basic liquid crystal cell platform may be tailored to address a novel polarization independent VOA having a default power state and now described in further detail.

Figure 16:
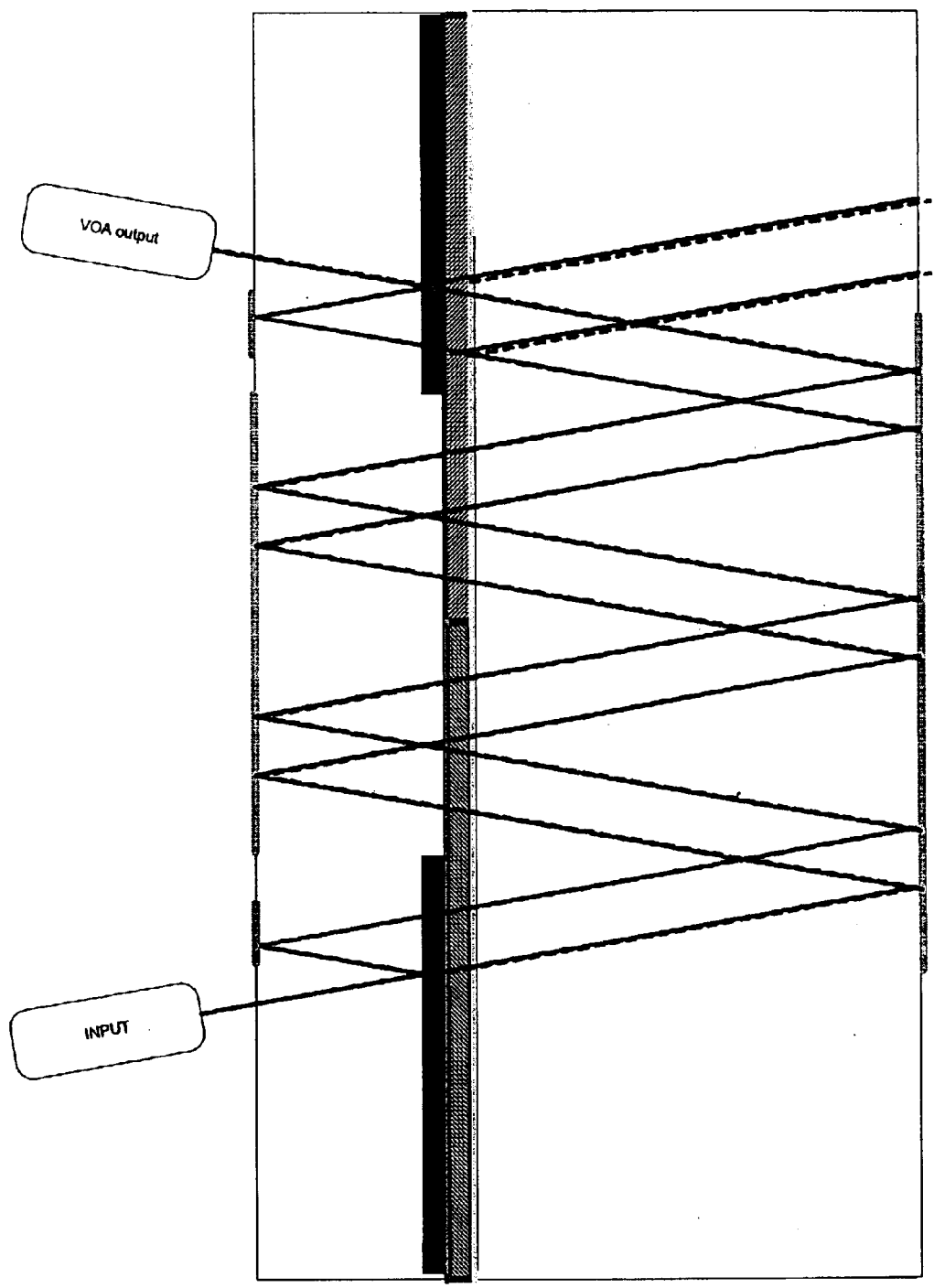
FIG. 16 shows the liquid crystal platform configured into a polarization independent multi-function variable optical attenuator that defaults to a known state in the case of power loss.

FIG. 16 shows another example of a VOA design using the same type of integrated liquid crystal engine. This design works like the simple VOA with the added features of faster response time and defaulting to known state in the case of power failure. The initial beam is decomposed into its orthogonal polarization components, which pass through the liquid crystal several times due to multiple reflections off of the simple mirrors coated on the exterior surfaces of the substrates. Since the beams are taking multiple passes to achieve the same rotation as in the previous (simple) VOA design, the cell can be much thinner and therefore, faster.

Midway through the cell, the liquid crystal alignment director changes. This means that during half of the beams' passes through the cell, they encounter liquid crystal molecules in one orientation and during the other passes they go through molecules aligned in the opposite (perpendicular) orientation. The purpose of this configuration is to ensure that when no voltage is applied to the cell, the beam exits in the non-rotated state. This enables the finished device to default to a known state in the case of power loss (either "on" or "off" depending on the orientation of the output PBS).

Wavelength Selector Switch

The basic liquid crystal cell platform may be tailored to address a wavelength selective switching application now described in further detail.

The device described herein is a wavelength selective switch comprised of a liquid crystal cell array with nanostructures deposited on one of the exterior or interior surfaces of the cell and an array of nanostructure filters, thin film filters, or other wavelength filtering technology. This design allows filtering and switching in highly integrated component.

Figure 17:
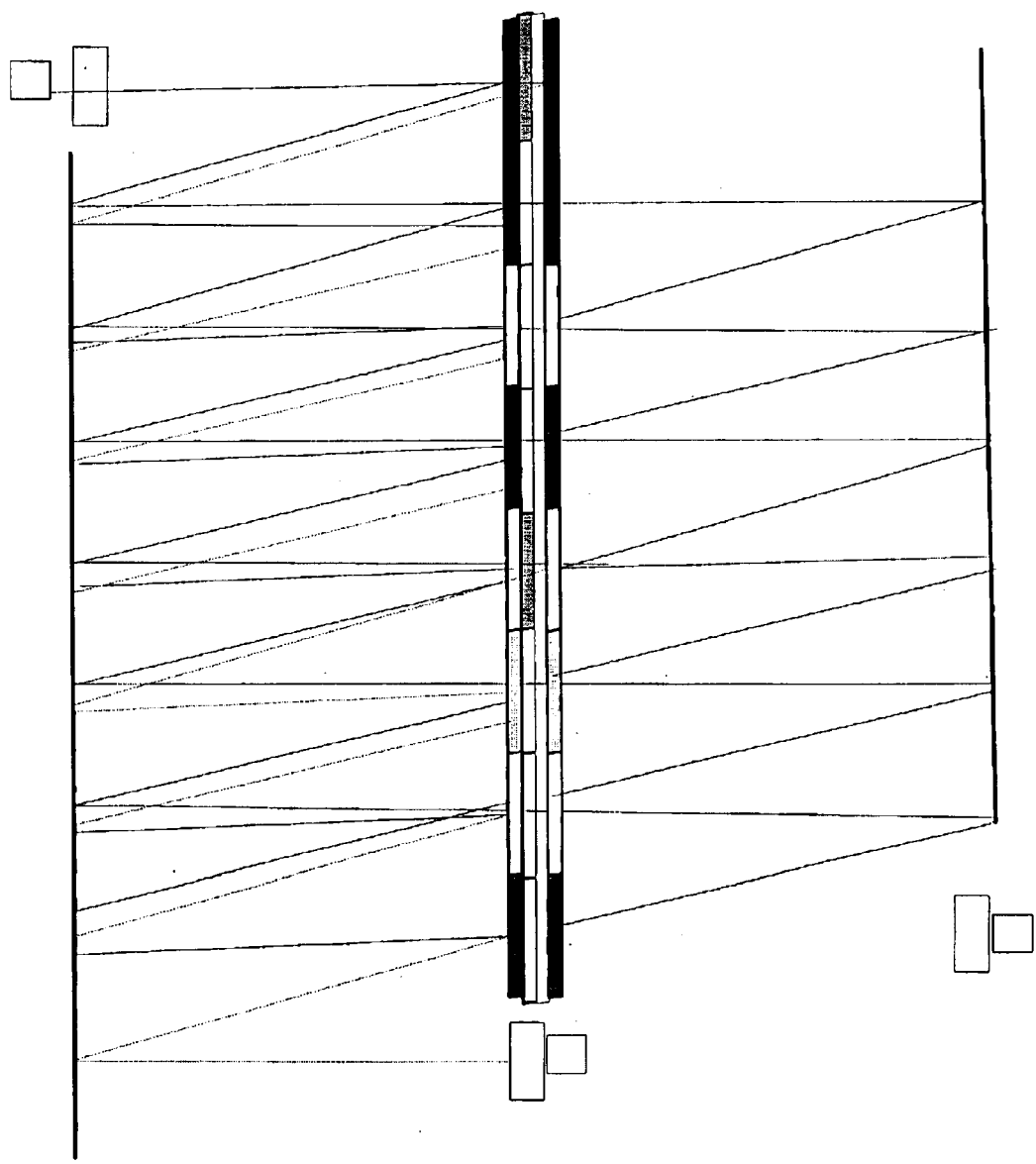
FIG. 17 shows a multi-pixel liquid crystal platform configured into a wavelength selector switch.

FIG. 17 shows a preferred wavelength selector switch. The device has one input collimator that introduces a beam that reflects alternately between a mirror and wavelength filters. The filters are shown with different colors to designate different wavelength selectivity. Previously described filter pixels constructs may be used to assemble this optical system and architecture.

In FIG. 17, the beam cascades down the mirror and filter array allowing one DWDM channel to pass at each interface while the rest continue down the path. After each channel is demuxed it passes through a pixel of the liquid crystal array. If the polarization is rotated to the orthogonal state, the beam is reflected off of the consequent polarization beam splitting nanostructure. If the polarization was left unchanged, it passes through the structure. In either case, the beam again cascades down a filter mirror channel until it reaches the output collimator. Any number of channels can be sent to the "through" output while the rest are sent to the "drop" output.

The filtering could be achieved using thin film filters or any other mux/demux filtering technology, but ultimately the filtering would be provided by an array of nanostructure filters deposited onto the liquid crystal cell surfaces. This solution provides a level of integration that dramatically improves cost, size, manufacturability and insertion loss.

Optical Multiplexer and Demultiplexers

The basic liquid crystal cell platform and prior art liquid crystal cells may be tailored to address a optical multiplexer and demultiplexer now described in further detail.

Gratings are a very effective and elegant method of multiplexing and de-multiplexing wavelength bands for telecommunications, astronomy, display, and other applications. Grating functionality is based on interference between wavefronts encountering repeated rows of very small (wavelength scale) peaks and valleys or slits. Volume phase gratings (VPG) are a variation of this concept based on narrow alternating regions of high and low index material. Generally they are built with photosensitive material whose index can be changed with UV exposure. The same index variation can be achieved with liquid crystal. There two ways to realize the liquid crystal grating: thin stripes of ITO to actively control index between alternating electrodes, or alternating perpendicular alignment zones to fix the index between neighboring regions.

Telecommunications systems strive to use as much bandwidth per fiber as possible in order to minimize cost and infrastructure. This requires components that can separate, redirect, measure, and recombine narrow frequency bands. Many technologies are competing for the multiplexing and de-multiplexing market but each has distinct advantages and disadvantages at this time. Thin film filters often have very good filter shape but this advantage decreases as channel spacing narrows. They also suffer from high chromatic dispersion and are suitable only for low channel count devices due to cost and insertion loss. Arrayed waveguide gratings (AWG) technology has very good filter characteristics and low chromatic dispersion but it needs to be cooled and only becomes advantageous for low loss and cost when channel count is high. Fiber Bragg gratings are another technology with very good filter shape and low chromatic dispersion. They also have low insertion loss and don't need a temperature controlled environment. They are very expensive though and they require circulators in order to cascade the filters for muxing and demuxing applications. This adds cost, size and complexity and is only reasonable at low channel count. A range of performance exists within the free space grating category because they can be built using very different methods (ruled, surface relief, holographic, volume phase, etc.). Volume phase gratings are a leader among grating technologies because they can achieve good filter shape with low insertion loss. They are reasonable solutions for either high or low channel counts and are potentially inexpensive. Liquid crystal based volume phase gratings maintain all of these favorable attributes while being very flexible in their manufacturing and design.

Since liquid crystal index of refraction is a controllable parameter, an actively controlled grating can be constructed. By turning adjacent electrodes "on" or "off" the grating period can be controlled by a customer rather than being fixed in the fabrication process- Varying the relative change in index of refraction of neighboring regions would change the efficiency and so variable attenuation could be built into the liquid crystal grating. The integration of active control along with this very promising VPG mux/demux technology makes liquid crystal gratings a unique and promising product.

VPGs obey the classical diffraction equation:

$$mv\lambda = \sin(\alpha) - \sin(\beta) \qquad \text{eqn 1}$$

where m is the order, v is the grating spacing frequency, $\alpha$ is the angle of incidence, and $\beta$ is the output angle of the wavelength $\lambda$.

In the case of the liquid crystal grating, the spacing frequency can be actively controlled through patterning and applying voltages to the ITO electrodes. So according to eqn. 1, for a given angle of incidence, each wavelength's exit angle can be varied.

The energy distribution satisfies the Bragg condition with maximum energy at$\lambda$:

$$mv\lambda = 2\sin(\alpha) \qquad \text{eqn 2}$$

This shows that varying the frequency of the grating will also change which wavelength has maximum efficiency.

The other controllable parameter for this type of grating is the difference in index of refraction ($\Delta n$) between the adjacent regions. In general, a larger Δn is better in order to maximize efficiency. With the correct choice of liquid crystal material, it can have a very high Δn (0.2 is common). Furthermore, voltage application will change the difference in index between pixels and so the efficiency can be tuned and the signal can be attenuated.

The static liquid crystal grating has excellent performance. The large Δn provides good efficiency and the flexibility of ITO patterning and liquid crystal manufacturing makes the grating easy to design, customize and build.

It is important to understand that the VPG multiplexer/demultiplexer of the present invention as herein described in this section, may be applied to prior art liquid crystal cells as well as the single and multiple pixel liquid crystal cell platform of the present invention.

Figure 18A:
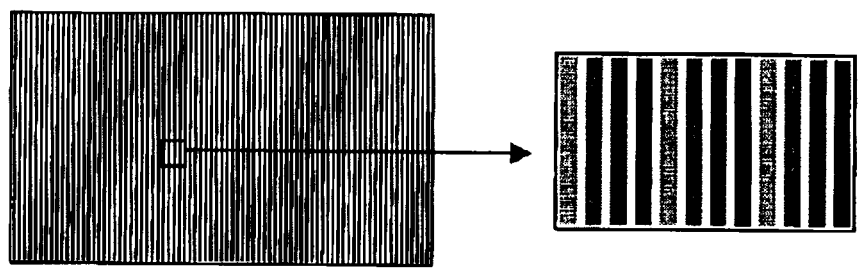
FIG. 18A shows stripped bands of electrodes that may be actuated to establish a liquid crystal cell having volume phase gratings.
Figure 18B:
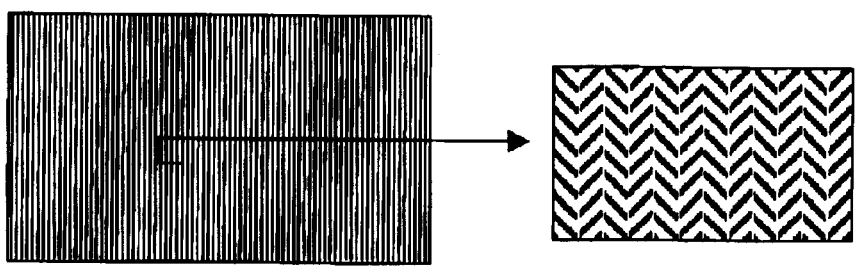
FIG. 18B shows a liquid crystal alignment layer patterned with different tilt orientations across the cell.

More specifically, a transparent liquid crystal cell VPG multiplexer/demultiplexer may consist of two glass substrates with transparent conductive electrodes coated onto one side and optional anti reflective coatings on the other side. Thin polymer alignment layers are coated on top of the electrodes and the two substrates are epoxied together. The cavity is filled with liquid crystal and plugged with more epoxy. The extension of this example liquid crystal cell to a novel liquid crystal grating involves one of two approaches:

1) Patterning the electrodes into thin, isolated strips across the cell as shown in FIG. 18A, or
2) Replacing the polymer alignment layer with a nanostructure grating or laser that can be deposited with different orientations across the cell as shown in FIG. 18B.

A first preferred embodiment of the multiplexer/demultiplexer (not shown) consists of the standard cell platform of the present invention with the electrode layer masked into stripped bands of electrodes in a manner similar to that shown in FIG. 18A.

A second preferred embodiment of the multiplexer/demultiplexer (not shown) consists of the standard cell platform of the present invention (spacer element, metal gasket, optional active thermal element) configured with an optical element nanostructured grating patterned in different orientations across the cell as shown in FIG. 18B.

A third preferred embodiment of the multiplexer/demultiplexer (not shown) consists of the standard cell platform of the present invention (spacer element, metal gasket, optional active thermal element) configured with a photosensitive UV alignment layer whose pattern may be formed in different orientations across the cell as shown in FIG. 18B by way of lithographic masking.

Tunable Filter

The basic liquid crystal cell platform may be tailored to address a polarization independent tunable filter application now described in further detail.

The present invention liquid crystal platform may be used to implement an optical spectral filter with tunable center wavelength to provide a linear tunable optical spectral filter with no mechanical or moving parts, compensated temperature performance, and superior optical properties with minimum complexity and cost.

The advantages of liquid crystal based tunable filter over existing technologies include durability due to the absence of mechanical moving parts, no stretchable medium required such as in Fiber Bragg tunable grating filters and derivatives, no loss of optical performance in the event of mechanical failure, no fatigue resulting from mechanical failure occurring over time, easiness of control, ability to provide tunable filter arrays, and overall temperature compensated optical performance.

The present invention tunable filter utilizes active liquid crystal in conjunction with passive optical elements to vary the index of refraction of the media. A change in index of refraction creates different waveguide conditions and affects the incident light propagation in the media. Wavelength tuning is achieved from the liquid crystal material's ability to change the index of refraction as a function of an external electrical field.

Any non-linearity in changing the center wavelength of the filter may be algorithmically compensated using a slightly modified thermal calibration and operating processes of the present invention in which a three dimensional curve fit is used to model a parameter space including either wavelength versus voltage and temperature or wavelength versus switching speed transition and temperature. This modification will be evident upon review of the thermal compensation calibration and operating loop as described in the ELECTRONIC CONTROL section later in this application.

Figure 19:
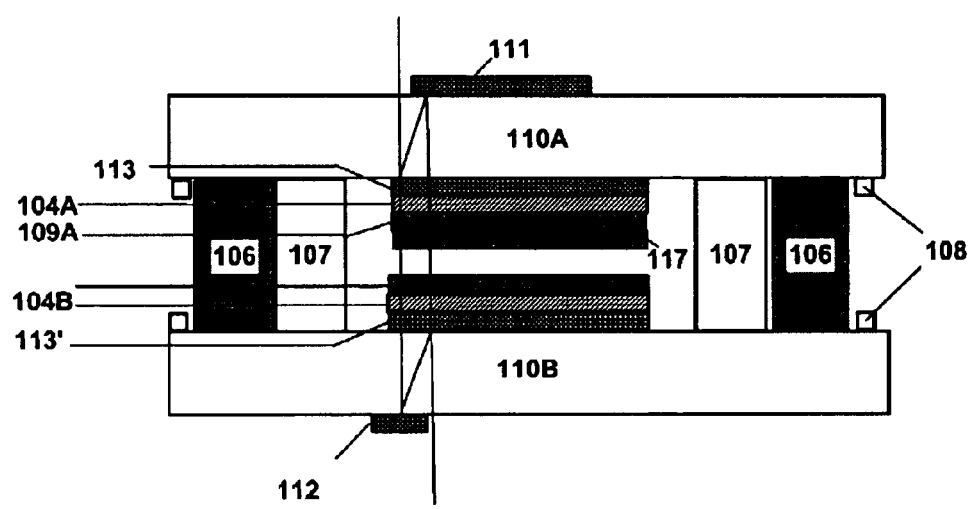
FIG. 19 shows a novel polarization independent liquid crystal tunable filter of the present invention.

FIG. 19 shows a novel polarization independent tunable filter configuration of the present invention. In this example tunable filter, it is preferred that the PBS/combiner pixel is used in conjunction with an optical element nanostructured waveguide grating 117 which may be applied over the anchoring layer 109A on the first substrate 110A as shown in FIG. 18. The optical element waveguide grating 117 may alternatively be applied over the electrode layer 104A and provide a dual function waveguide grating and liquid crystal anchor layer (not shown). The nanostructured waveguide grating 117 may be applied using imprint lithography and thin film deposition and such optical elements are currently available from NanoOpto of New Jersey. Finally, the nanostructured waveguide grating 117 may be electrically conductive and provide a triple function i) resonant waveguide filter core, ii) liquid crystal anchoring layer, and; iii) liquid crystal electrode layer.

Flexibile Optical Add Drop Multiplexer (FOADM)

Various embodiments of the basic liquid crystal cell platform may be integrated into a flexible optical add drop multiplexer application. More specifically, a 1×2 and a 2×1 optical switch may be combined with a tunable filter configuration to achieve a hitless optical add drop multiplexer.

Currently there is a push to develop ROADMs and FOADMs that allow ITU channels to be dropped, added or passed through at any junction. ROADMs generally have fixed filters and each add and drop fiber corresponds to a known fixed wavelength. FOADMs add flexibility because this single component uses a tunable filter allowing it add or drop any wavelength within the device's tuning range to a single fiber. Coupled with tunable lasers, FOADMs will enable a cheaper (less parts), more flexible network.

The filter function of the device is based on nanostructure sub wavelength gratings. Light is coupled into a grating cavity, which acts as a waveguide and is transparent to all wavelengths except for the one that satisfies the resonant condition of the cavity. The resonant wavelength is reflected. Tunability of the filter is achieved by coupling the nanostructure into a liquid crystal cell. Applying voltage across the liquid crystal controls the index of refraction and as the evanescent wave traveling through the LC experiences this index change, the reflected wavelength condition changes.

The other important aspect of this FOADM design is that it utilizes 1×2 and 2×1 switching on either side of the tuning element. This way, either all wavelengths are traveling unimpeded through the device, or they are traveling through the tunable element and one is being dropped. When the drop channel changes, the device switches to the express leg during the tuning so that intermediate channels aren't disrupted. This allows the device to be "hitless".

Figure 20:
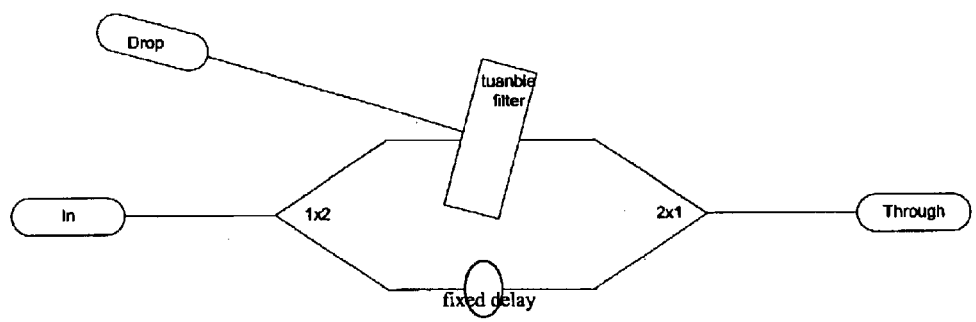
FIG. 20 shows a novel hitless flexible optical add drop multiplexer architecture.

FIG. 20 shows a preferred configuration for the FOADM. With respect to FIG. 20, light enters the device through the input collimator and goes to a liquid crystal 1×2 switch. One port of the switch connects to one port in an identical 2×1 switch. A piece of quartz or some other component that creates a fixed delay is inserted in this path. The delay time is equal to that of the tunable filter on the other leg. The second port of the 1×2 leads to a tunable filter comprised of an LC cell built with a nanostructure filter deposited on the inside of one piece of the cell substrate. The light reflected from the filter goes to a drop channel and the light transmitted through the filter goes to the second port of the 2×1 switch. The 1×2 and 2×1 must act as splitters/coupler during the switch (no dark time). This can be achieved with LC cells and birefringent walk off crystals or LC cells and nanostructure polarization beam splitters. The sum of the light between the two output ports (1×2) and input ports (2×1) must be constant during the switch so that there is no signal interruption.

Electronic Control System

A common control system may be easily modified to drive the optical switch, polarization independent VOAS, wavelength selector switch, multiplexer/demultiplexers, tunable filter and flexible optical add drop multiplexer applications of the present invention.

Figure 11:
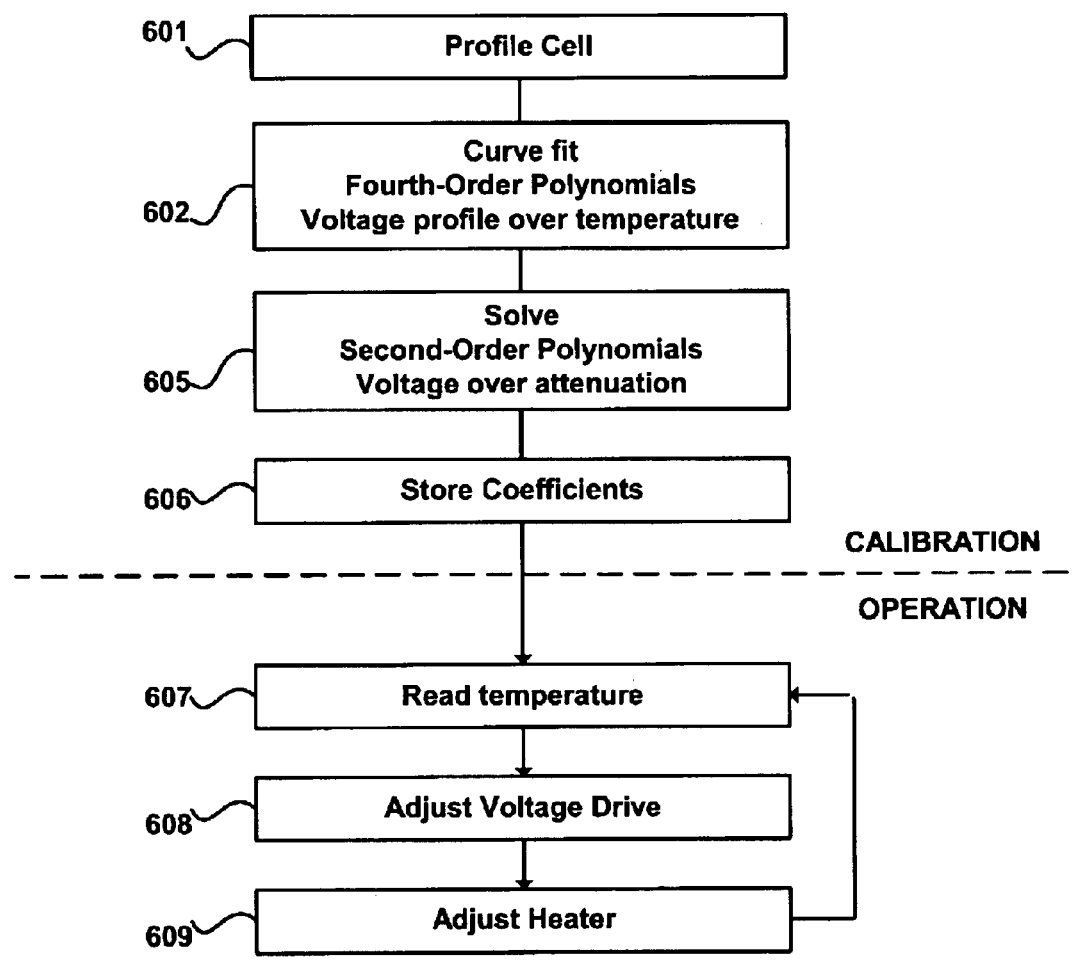
FIG. 11 shows the liquid crystal thermal calibration and feedback loop method flows.
Figure 12:
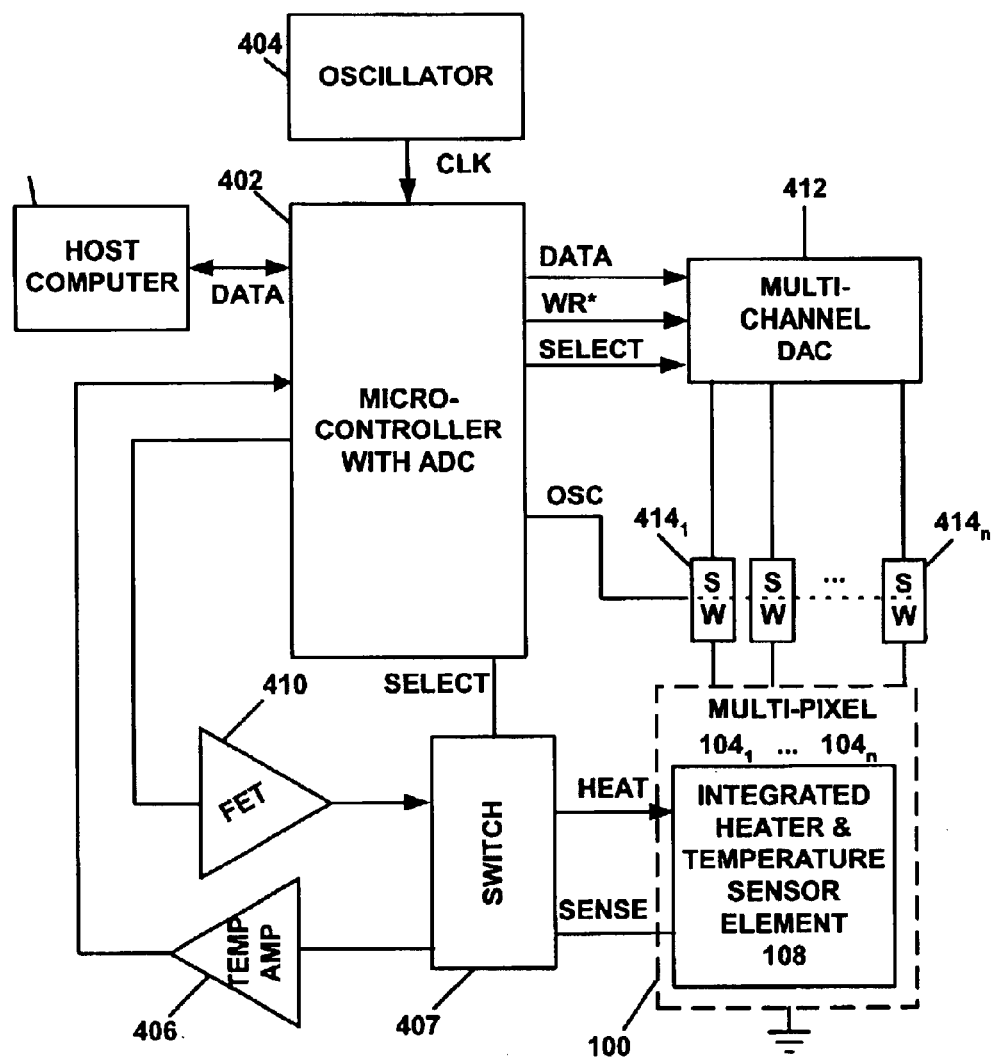
FIG. 12 shows a block system diagram for the electronic control and thermal management system of the present invention.

A block diagram of the control system and components directed to a liquid crystal cell and host controller are included in FIGS. 11 and 12 along with the liquid crystal thermal management and voltage controller subsystems of the present invention, now described in further detail.

In one example configuration, host computer 400 may be configured to communicate with microcontroller 402 over a full duplex data interface and enabling the host computer to engage functions, send commands and retrieve data from microcontroller 402. Microcontroller may be configured to store software control routines. The software control routines may function to adjust voltage drive provided to each pixel in the liquid crystal cell in response to temperature fluctuations.

The microcontroller may utilize a time division multiplexing scheme that multiplexes temperature sensing and heating functions in the integrated sensor/heater device such that the cell may generally be kept at a constant temperature. A calibration process characterizes the profile of the cell and generates a polynomial regression formula that provides the optimal voltage drive output for given temperature and cell state inputs. The microcontroller 402 stores the state of the liquid crystal cell, the regression formula, and reads the temperature of the liquid crystal cell to compute and assert the temperature compensated voltage drive.

FIG. 11 shows a calibration process that may be used to perform the method of the present invention in which a liquid crystal cell thermal operating characteristic profile is translated into deterministic coefficients assembled into a stored regression formula used to adjust the voltage drive to the cell in response to temperature and cell state.

The first step to determine the coefficient values in the cell's temperature and voltage compensation profile, is to profile the liquid crystal cell drive characteristics across a range of temperatures. The profile process step 601 may examine a light source passing through the cell and its attenuation at a given voltage and temperature combination. An operational liquid crystal cell is placed in a thermal chamber programmed to change operating temperature across the desired temperature range at a given interval. At every temperature change interval, a range of voltages are provided to the liquid crystal cell while a performance characteristic, such as attenuation, is measured. Voltage is scanned until reference attenuation levels are achieved, at which point the voltage, attenuation and temperature levels are stored as a grid reference in a cell profile definition table. The performance of the liquid crystal cell is recorded at grid point attenuation and temperature levels, resulting in a multi dimensional lookup table whereby any temperature and voltage input provides an attenuation level output. This table may be represented as a three dimensional surface.

The second step requires processing the lookup table to smooth the voltage profile over temperature at the given attenuation levels as recorded in the previous step. A statistical program capable of performing regression analysis, such as Mathematica® may be used to perform this process step 602. The regression software is provided with the look up table generated in step one, and performs a fourth order regression curve fitting process that generates for each attenuation level, the appropriate coefficients a,b,c,d, and e representing a voltage versus temperature profile of the cell at each attenuation level, represented by the following formula, $$v = a + bT + cT^2 + dT^3 + eT^4$$

$$v_1 = a_1 + b_1T + c_1T^2 + d_1T^3 + e_1T^4$$

$$v_2 = a_2 + b_2T + c_2T^2 + d_2T^3 + e_2T^4$$

$$\vdots$$

$$v_n = a_n + b_nT + c_nT^2 + d_nT^3 + e_nT^4$$

where V=voltage, T=liquid crystal cell temperature, a,b,c,d,e=curve fit coefficients, and n=attenuation level.

Given that smooth curves result from the prior step that define the optimal voltage drive level for a given temperature at the recorded grid attenuation level, step three results in smooth curve regressions fit across orthogonal axis of the three dimensional surface, whereby the smooth curves are fit over the coarse attenuation grid recorded in step 1. In this third process step 603, the five coefficients of the previous step are each solved by a second order regression. Specifically, Mathematica® or any suitable program is used to solve for the three coefficients that fit the profile of each of the five coefficients a,b,c,d and e across all of the orders of the regression $v_n = a_n + b_nT + c_nT^2 + d_nT^3 + e_nT^4$. So, a smooth surface profile defines the optimum voltage compensation level given an input attenuation state and temperature by the following formula $$v = a + bT + cT^2 + dT^3 + eT^4, \text{ where,}$$

$a = (X + Y\theta + Z\theta^2)$
$b = (X_1 + Y_1\theta + Z_1\theta^2)$
$c = (X_2 + Y_2\theta + Z_2\theta^2)$
$d = (X_3 + Y_3\theta + Z_3\theta^2)$
$e = (X_4 + Y_4\theta + Z_4\theta^2)$
Theta=liquid crystal attenuation level
X,Y,Z=solution to zero order coefficient
$X_1, Y_1, Z_1$=solutions to first order coefficient
$X_2, Y_2, Z_2$=solutions to second order coefficient $X_3$, $Y_3$, $Z_3$=solutions to third order coefficient
$X_4$, $Y_4$, $Z_4$=solutions to fourth order coefficient The fifteen coefficient solutions (Xn,Yn,Zn) where n=0 to 4, may be generated by Mathematica, using the Fit(data, {1,x,x^2, . . . ,x^n},x) function or other suitable software packages capable of performing curve fitting regression.

Step four is the final step in the calibration process of FIG. 11, process 606, and results in storing the coefficients in the liquid crystal control system which is now described.

The coefficients that profile the liquid crystal characteristics may be stored in microcontroller 402 memory (FIG. 12) by flashing the memory of the microcontroller with the appropriate 15 coefficient values.

The thermal compensation system of the present invention operates by reading the temperature of the liquid crystal cell and adjusting the voltage drive of the cell based on the cell state. The cell state may typically be OFF, ON or operate in a variable mode. The cell state may be stored in the microcontroller 402 and also be configured via the host computer 400.

Microcontroller may be a PIC microchip having an internal analog digital converter and operating with a 10 Mhz crystal oscillator. 404 clock. The microcontroller may be programmed to cycle through all pixels in the cell to controllably apply voltage to each pixel. The microcontroller may be connected to a multi-channel digital analog converter (DAC) con figured to provide an output voltage level in response to a configuration pulse stream from the microcontroller over a serial interface. The output of the DAC connects to the input of an analog switch array having switching element $414^n$ associated with each pixel in the cell. Each element in the switch array 414 preferably shares a 1.2 khz clock provided by an output port pin of the microcontroller.

Other drive frequencies may be used to actuate the liquid crystal material. In addition, A frequency modulated drive may be incorporated into the platform to replace the amplitude modulated voltage drive. Such FM drive may also be optimized using the same methodology as described later in the thermal compensation calibration and operation loops.

With respect to the continuing example and for any given pixel, DATA is passed to the DAC along with a SELECT pulse train encoding the appropriate voltage amplitude at the Nth output channel. A WR command sent to the DAC causes the DAC output to be received at the input of the Nth analog switch $414^n$, triggering the application of an AM transmission over a 1.2 khz carrier to be applied to the appropriate liquid crystal cell electrode $500^N$. As the microcontroller cycles through each iteration of the process steps described above, N is incremented and the voltage is applied the next pixel in the system.

A temperature sensor reading may be provided by the internal integrated heater/temperature sensor from an external device. One of the heater/temperature sensor electrodes 502 or 502' of the liquid crystal cell 100 may be grounded while the other may connect to switch 407. Switch 407 may selectively engage the integrated heater/temperature sensor element 108 in a sense or heat mode. More specifically, switch 407 may be configured ON to connect the ungrounded heater/temperature electrode through instrumentation amplifier 406 to an ADC coupled to the microcontroller which reads the temperature on the liquid crystal cell, or it may be configured OFF so that power amplifier FET 410, which may be controlled by a pulse train from microcontroller 402 and applies a voltage potential to operate the device 108 as a heater.

In a temperature sense feedback closed loop operation, which shall hereby be referred to as the loop embraced by process steps 607 through 609 of FIG. 11, the microcontroller reads the temperature of the liquid crystal cell and calculates the voltage drive based on the sensed temperature, T, and the current state of each pixel, Theta. The fifteen coefficients are plugged back into the fourth order regression formula to establish a smooth surface profile delineating an optimal voltage to supply to the pixel for a given temperature and pixel attenuation level:

$$v = (X + Y\theta + Z\theta^2) + (X_1 + Y_1\theta + Z_1\theta^2)T + \\ (X_2 + Y_2\theta + Z_2\theta^2)T^2 + (X_3 + Y_3\theta + Z_3\theta^2)T^3 + (X_4 + Y_4\theta + Z_4\theta^2)T^4$$

The new voltage value V is stored in the microcontroller for transmission to the DAC 412 during the next voltage application cycle.

The liquid crystal cell may also be maintained about a reference temperature. Process step 609 with respect to FIG. 11 involves the application of heat to maintain the temperature of the liquid crystal cell about a reference temperature. The reference temperature may be above the ambient room temperature or above the temperature of any carrier device that may be coupled to the liquid crystal cell. The selection of a reference temperature above the ambient temperature will result in the tendency of the liquid crystal cell to cool to meet the ambient temperature after the application of a heat burst. A counter thermal bias is therefore generated to support temperature stability about the reference temperature.

Microcontroller memory may store the reference temperature, the value of the current temperature, historical temperatures, and, historical levels of heat applied to the liquid crystal cell. The value of the sensed temperature T at every instance may be compared against the reference temperature to determine the amount of heat to apply to the liquid crystal cell. An 8 bit analog digital converter will provide approximately ⅓ of a degree of temperature sensing resolution over the desired temperature range, so the example system may provide for temperature stability about a reference temperature to within ⅓ degree Celsius. At every instance of process step 609, a threshold detector routine stored in microcontroller ROM may trigger a control function if the sensed temperature of the liquid crystal cell falls below the desired operating reference temperature. The control function may determine how much heat to apply to the liquid crystal cell. The control function may utilize error minimizing routines that track the change in temperature across multiple instances of process step 609. The error correcting routines may store the previous temperature reading T0 along with the previous amount of heat applied to the liquid crystal cell H0. The temperature reading and every succeeding temperature reading T1 may be compared against T0 to determine the amount of temperature change resulting from the previous heating of the liquid crystal cell. Heat may be applied to the liquid crystal cell by way of the FET power driver as described above. The heater may be triggered at a fixed or variable duty cycle and controlled using frequency or amplitude modulation.

Although the present invention has been fully described by way of description and accompanying drawings, it is to be noted that various changes and modifications will be apparent to those skilled in the art. For example, various patterns may be used to form the spacer element, metal gasket and integrated heater/temperature sensor elements of the multi-pixel cell platform. Use of external temperature sensors and heaters in part or whole may be applied using the temperature compensation methods and regression of the present invention. The conductive electrode layer 104 may be transparent or reflective, depending on the application and pixel type. The metal gasket may be modulated to provide heating function in addition to its function as a moisture barrier support membrane. Epoxy gaskets may be used in combination with metal gasket elements in part or whole, and the metal gasket elements may comprise a single solder cap. Anchoring and aligning the liquid crystal material in a cell may also be performed using photo alignment material, Staralign by Vantio of Switzerland or other known alignment methods, including laser etching. Anchoring the liquid crystal material in the cell (described hereunder as step five) may be performed before patterning of the polyimide (described hereunder as step four). The process steps for the closed loop temperature feedback may also be rearranged such that the heating process is performed prior to applying the voltage drive. The order of fitting voltage with each dimension of the three dimensional surface is reversible and other three dimensional surface fitting algorithms may be used, including but not limited to those that describe a surface with one dimension fitting a fourth degree polynomial and the other dimension fitting a second degree polynomial. Amplitude or frequency modulation may be used to drive the liquid crystal cell. An electrically conductive nanostructure grating optical element can be disposed on the inside surface of substrate 110A or 110B to provide the optical function and further eliminate the need for the alignment layer and/or electrode layers that are otherwise applied to the surface of substrates 110A and 110B. It is well within the scope of the present invention to make modifications to the electrode masks to produce any size array of liquid crystal cells in any first, second or third dimension. Finally, it is well within the scope of the present invention to change the electrode masks accordingly to modify the shape of each pixel.

Therefore, it is to be noted that various changes and modifications from those abstractions defined herein, unless otherwise stated or departing from the scope of the present invention, should be construed as being included therein and captured hereunder with respect to the claims.

What is claimed is:

1. A polarization independent liquid crystal tunable filter, comprising:

A first substrate having a top surface optical element rotating mirror and a bottom surface having a polarization beam splitter optical element, a first electrode layer positioned over the polarization beam splitter optical element, first alignment layer positioned over the first electrode layer, and a optical element waveguide nanostrucuture grating filter positioned over the first alignment layer, a second substrate placed in opposition to the first substrate and having bottom surface optical element rotating mirror and a top surface having a polarization beam splitter optical element, a second electrode layer positioned over the polarization beam splitter optical element and a second alignment layer positioned over the second electrode layer, said second substrate positioned such that its top surface is opposed to the bottom surface of the first substrate, liquid crystals coupled between the first and second substrates.

2. The polarization independent liquid crystal tunable filter of claim 1, further comprising a spacer element coupled between the first and second substrates.

3. The polarization independent liquid crystal tunable filter of claim 2, further comprising a metal gasket element bonded to the first and second substrates.

\* \* \* \* \*